US006981265B1

(12) United States Patent
Rees et al.

(10) Patent No.: US 6,981,265 B1
(45) Date of Patent: Dec. 27, 2005

(54) OBJECT GATEWAY FOR SECURELY FORWARDING MESSAGES BETWEEN NETWORKS

(75) Inventors: Robert Thomas Owen Rees, Newport (GB); Nigel John Edwards, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/555,465

(22) PCT Filed: Dec. 4, 1998

(86) PCT No.: PCT/GB98/03632

§ 371 (c)(1),
(2), (4) Date: May 30, 2000

(87) PCT Pub. No.: WO99/28819

PCT Pub. Date: Jun. 10, 1999

(30) Foreign Application Priority Data

Dec. 4, 1997 (GB) .................................. 9725742

(51) Int. Cl.[7] .............................................. G06F 9/46
(52) U.S. Cl. ..................... 719/313; 719/313; 719/315; 719/316; 719/330
(58) Field of Search ....................... 709/310, 311, 316, 709/313, 315, 330

(56) References Cited

U.S. PATENT DOCUMENTS

| 5,742,759 | A | * | 4/1998 | Nessett et al. ............... 713/201 |
| 5,862,328 | A | * | 1/1999 | Colyer ....................... 709/203 |
| 5,864,866 | A | * | 1/1999 | Henckel et al. .......... 707/103 R |
| 5,991,877 | A | * | 11/1999 | Luckenbaugh .............. 713/200 |
| 6,105,132 | A | * | 8/2000 | Fritch et al. ................ 713/167 |
| 6,134,594 | A | * | 10/2000 | Helland et al. ............. 709/229 |
| 6,182,154 | B1 | * | 1/2001 | Campagnoni et al. ....... 709/315 |
| 6,189,048 | B1 | * | 2/2001 | Lim et al. ................... 709/330 |
| 6,282,580 | B1 | * | 8/2001 | Chang ........................ 719/316 |

FOREIGN PATENT DOCUMENTS

GB 2 305 270 4/1997

OTHER PUBLICATIONS

M. Steinder, A. Uszok and K. Zielinski, "A Framework for Inter-ORB Request Level Bridge Construction," Proceedings of the IFIP-IEEE International Conference on Distributed Platforms, p. 86-99, 1996.*
"ORB 2.0 RFP Submission," Mar. 1994, IONA Technologies SunSoft Inc., OMG TC Document 94.3.1.*
M. Steinder, A. Uszok, and K. Zielinski, "Construction of a Generic Inter-ORB Bridge," 1998.*

(Continued)

*Primary Examiner*—Meng-Al T. An
*Assistant Examiner*—Li Zhen

(57) ABSTRACT

A network gateway (1005) is described, wherein an object invocation (1020) containing an embedded object reference (1025), which points to a further object (1002), is modified on passing through the gateway. The gateway validates the object invocation and enacts a number of security tests thereon before forwarding it on. In preferred embodiments, the embedded object reference is replaced by an object reference (1035) to a gateway proxy specifically for the further object (1002). The replacement object reference (1035) also includes enough information that the original object reference (1025) can be recovered. The gateway proxy is generated on or after receipt of the invocation (1020). In the event the further object (1002), which was the subject of the object reference, is itself invoked, the invocation is directed to the gateway proxy, which in turn recovers the original object reference and forwards the invocation on to the further object (1002).

34 Claims, 16 Drawing Sheets

OTHER PUBLICATIONS

A. Uszok, G. Czajkowski, and K. Zielinski, "Interoperability Gateway Construction for Object-Oriented Distributed Systems," Mar. 1994.*

Aniruddha Gokhale and Douglas C. Schmidt, Evaluating the Performance of Demultiplexing Strategies for Real-time COBRA, Nov. 1997, pp. 1-8.*

Steinder, et al., "A Framework for Inter-ORB Request Level Bridge Construction," Proceedings of the IFIP-IEEE International Conference on Distributed Platforms, pp. 86-99, 1996.

Evans, et al., "Using Java Applets and Corba For Multi-User Distributed Applications," IEEE Internet Computing, vol. 1, No. 3, pp. 43-55, 1997.

Hoffner, et al., "Inter-operability and distributed application platform design," Proceedings of the IFIP/IEEE International Conference on Distributed Platforms: Client/Server and Beyond: DCE, CORBA, ODP and Advanced Distributed Applications, pp. 342-356, 1996.

Minton, G., "IIOP Specification: A Closer Look," *Unix Review*, vol. 15, No. 1, pp. 41-50, 1997. (Published article and original format).

Hoffner, et al., "Federation and Interoperability," ANSA Workprogramme Architecture Report APM.1514.01, 1995.

*The Common Object Request Broker: Architecture R Specification*, Rev 2.0, Object Management Group document format/97-02-25, chapters 9-11, 1995.

* cited by examiner

OBJECT GATEWAY FOR SECURELY FORWARDING MESSAGES BETWEEN NETWORKS

TECHNICAL FIELD

The present invention relates to distributed computing systems and particularly, but not exclusively, to gateways, and methods of operating gateways, that are interposed between different networks in object based, distributed computing systems.

BACKGROUND ART

Object based systems are generally known. Presently, the best known model for an object-based system, or architecture, is the Common Object Request Broker Architecture (CORBA), which is supported by a consortium called the Object Management Group (OMG) comprising over 700 companies. Another well known model is Microsoft's Distributed Component Object Model (DCOM), which shares many principles with CORBA. While many of the principles discussed below relate to object-based systems in general, for ease of description only, the description is directed to the specific case of CORBA. The skilled person will appreciate, however, that the principles are more widely applicable, for example to DCOM.

CORBA can be considered as a model for middleware applications, which defines how blocks of intelligence, known as objects, interact across a distributed computing and communications environment. CORBA is well documented and will not generally be considered in any depth in this description. The book "Instant CORBA" by Robert Orfali et al (published by Wiley Computer Publishing, John Wiley & Sons Inc., Copyright 10997, ISBN 0-1371-1081233-4), however, provides a comprehensive introduction into CORBA and, as such, provides background to the principles described herein.

It is usual for companies to protect their internal network, or intranet, from attacks from the public Internet by using gateways or firewalls which monitor and restrict the flow of information between the Internet and the intranet. Some companies also have a need to deploy firewalls internally to restrict and monitor the flow of information between different parts of the enterprise.

CORBA is receiving increasing attention as more and more companies adopt it as the model for the backbone for their enterprise information architectures. One of the main barriers to CORBA deployment, however, is the lack of a defined mechanism for implementing gateway or firewall technology.

Hereafter, the term 'gateway' will be used to describe any physical or logical system or process that can be placed between networks such as the Internet and an intranet.

It is an aim of the present invention to provide a gateway which can support CORBA and the like.

DISCLOSURE OF THE INVENTION

In accordance with a first aspect, the present invention provides a system arranged to provide a gateway between a first network and a second network the system comprising:

interface means to receive from the first network a message intended for an object in the second network, the message including an identifier for a further object in either the first or second network;

means to generate further interface means for receiving from the second network messages for the further object;

means to form a new identifier for the further interface means;

means to replace the received identifier with the new identifier in the invocation; and means to forward the message to the object in the second network.

As used herein, the term 'message' is intended to include any transmitted packet, or collection, of data that includes an identifier, such as a CORBA object reference. Typically, but not exclusively, a message will comprise either an object invocation or the response from an object that was invoked by an invocation. Either or both an invocation or a response thereto can include an identifier such as an object reference. Also, the term 'network' is used in the very broadest sense, and can mean (without limitation) the Internet, an intranet or extranet, a multiplicity of networks or even a single communications link on one side of the gateway system.

This aspect of the invention addresses a problem that a message, such as an object invocation, can include identifiers, such as CORBA object references, to other objects. Therefore, for example, an object invoked from across the gateway can receive such identifiers and, subsequently, use them to invoke the respective referenced objects, or pass the identifiers somewhere else. Typically, gateways require a specific interface, or proxy, to be in place to manage interaction with a particular object across the gateway. One method for addressing this issue would be to include in the gateway proxies for all possible objects that can be invoked. An alternative would be for all identifiers to include information about the respective proxies. However, the applicants have addressed the issue in a slightly more complex, but far more flexible, manner by arranging for the gateway to take steps to form a proxy for a specific object only when (or after) a corresponding identifier is encountered.

The new identifier may include information to enable subsequent recovery by the system of the received identifier.

In a preferred embodiment, the new identifier includes a representation of the received identifier. In an alternative embodiment, the new identifier includes an indication of the identity of the received identifier and the system includes means to associate said indicator with said received object reference.

Thus, for the example of the message being an object invocation, the invoked object receives a new identifier rather than the original identifier. If the invoked object, acting now as an invoking object, uses the new identifier to make a further object invocation, the invoking object will send the invocation to the specified, further interface means on the gateway. Otherwise, the invoking object would attempt to invoke the referenced object directly, and fail due to the lack of a defined interface means in the gateway to process the invocation. Further, since the new identifier also includes information to enable recovery of the original identifier, and this information is passed in the invocation, the gateway is able to receive and process the invocation and then forward the invocation on to the originally-referenced object.

In a preferred embodiment, the system comprises means to include in the new identifier an indication that the received identifier was received in a message from the first (or second) network. Such an indication can be used by a gateway receiving an identifier, which is itself a new identifier, to determine whether the gateway was the one responsible for forming the new identifier in the first place. If it was, then, rather than forming another new identifier, the gateway can simply revert to, or 'unwrap', the original identifier. Thus, only the original identifier need be forwarded in the message to the desired destination object.

In a preferred embodiment, the system comprises means to include in the new identifier a name tag to identify the interface means which is generating the new identifier.

The name tag can be used by the gateway to determine whether an object to be invoked is available via the gateway at a later time. In a CORBA system, determination of the availability of the object can be made using a naming service call, as will be described in the detailed description below.

In a preferred embodiment, the system comprises means to include in the new identifier check data for checking the validity of the or at least a part of the new identifier. The check data may comprise the result of a hash operation on the, or the at least part of the, new identifier and a secret.

The check data preferably comprises the result of a hash operation on at least the identifier, host and port, and a secret. For example, the check data can be used by the gateway to verify that an invocation has arisen from a valid new identifier previously generated by the gateway, rather than from an un-trusted source. Thus, the check data adds a high level of security to the gateway. In this way, even if an un-trusted party gains knowledge of the location of a valid object on the other side of the gateway, the party will not be able to invoke the object without knowing the hash operation and, more particularly, the secret, which is stored securely by the gateway.

In a preferred embodiment, the means to generate the further interface means comprises means to determine on the basis of the received identifier whether a template for an appropriate further interface means is already known to the system.

If a template is not known, the means to generate the further interface means may be operable to obtain an appropriate template from a remote interface repository. Alternatively, or additionally, the means to generate the further interface means may comprise means, which is operable in the event no appropriate template is known to the system and/or an appropriate template is not recoverable from a remote repository, to obtain a generic template.

In any case, in a preferred embodiment, the means to generate the further interface is arranged to at least obtain a template for the further interface means on or after receipt of the received identifier and in advance of receipt of a message for the further object.

As soon as a template for the interface is available, it is a standard operation to instantiate from the template the further interface for the further object. Whether the actual interface is instantiated as soon as the template is available, or whether the interface is instantiated only on receipt of, for example, an object invocation, is a matter for the gateway administrator to decide. For example, if the nature of the system dictates that an invocation on the basis of the new identifier is highly likely, then it would be worth instantiating the further interface as soon as possible. On the other hand, if there is less of a likelihood that an invocation on the basis of the new identifier will be received, then it would be justifiable not to instantiate the interface unless an invocation were received.

By obtaining an appropriate template for an anticipated message as soon as the gateway sees an identifier in a message, the time taken to process an message, which is increased by the gateway needing to generate an appropriate interface means, or proxy, to process the message, is reduced considerably.

The obtaining of the template and instantiation of the interface means could occur at any time after the receipt and processing of the message containing the identifier (which is used in the eventual invocation).

Clearly, in any system where the interface means is instantiated in advance of receiving a corresponding message, state-build would occur.

A very convenient way to control such state build up, for example, is to specify the interface means with some form of time-out, for example an hour, 24 hours, or one week, after which the interface means is deleted from the system. After deletion, the interface means would not be instantly available, but would still be available, with a delay, by using the template.

In a preferred embodiment of the present invention, the gateway is configured for operation within a trusted operating system environment, which preferably supports mandatory access control (MAC). Using MAC can provide greater security for the gateway.

A particularly suitable trusted operating system is Hewlett-Packard's VirtualVault Operating System (VVOS) based on HPUX 10.24 VVOS, which provides a MAC policy governing the way data may be accessed on a trusted system.

The MAC policy is a computerised version of the US Department of Defence's long-standing multilevel security policy for handling classified information. The MAC policy uses labels that reflect information sensitivity, and maintains those labels for every process and file system object to prevent users not cleared for certain levels of classified information from accessing it. Under MAC, users and processes are also assigned clearances. A clearance defines the maximum sensitivity label the user or process can access, which is necessary since some users and processes have privileges that allow them to switch between sensitivity labels. Using the MAC policy, the operating system controls access based on the relative sensitivity of the applications running and the files they access.

Further details of how to implement the gateway in a trusted operating system are provided in the specific description below.

Preferably, the system comprises at least two logical compartments and a trusted relay process that has privileges necessary to pass messages between the two compartments. Further, the first network and the respective interface means are associated with a first compartment and the second network is associated with a second compartment.

Additionally, a secret, usable by the system in a hash operation for validating object references, is preferably associated with a third compartment, and only the trusted relay process has the privileges necessary to retrieve the secret from the further compartment in order to enact a hash operation.

It will be appreciated that the interface means can receive messages including identifiers from either the first or second network, each being either 'inside' or 'outside' networks, and enact the replacement of identifiers appropriately.

Preferably, in the case of CORBA, identifiers are Interoperable Object References (IOR)s including host, port and key parameters. The host parameter defines to which host a message for the object should be directed, the port parameter defines to which port on the host the message should be directed and the key contains data to be passed to the object. Also, a new identifier is preferably in the form of an IOR and has host and port parameters which define the further interface means as the host to which the message should be directed.

In accordance with a further aspect, the present invention provides a method of controlling a gateway to pass messages between first and second networks attached to the gateway, the method comprising the steps of:

receiving from the first network a message intended for an object in the second network, the message including an identifier for a further object in either the first or second network;

generating means to receive messages for the further object;

forming a new identifier for the means to receive messages for the further object; replacing the received identifier with the new identifier in the message; and forwarding the message to the object in the second network.

Further features of the present invention are described in the detailed description below and are claimed herein.

BRIEF DESCRIPTION OF THE DRAWINGS

Embodiments of the invention will now be described in more detail, by way of example only, with reference to the drawings, of which.

BEST MODE FOR CARRYING OUT THE INVENTION, & INDUSTRIAL APPLICABILITY

The following description uses the CORBA model in all the examples based on HP's 'ORB Plus' ORB. Further, 'messages' are in the form of object invocation, or responses thereto, and 'identifiers' are in the form of IORs. Although the implementation of the gateway is described in terms of HP's ORB Plus, it will be appreciated that the skilled person would be capable of adapting the design to any other ORB that provides similar functionality. As well as running on conventional operating systems such as HPUX or Windows NT, if they are believed to be secure enough, the gateway is preferably run on a trusted operating system such as HP's VirtualVault, running under HP's VVOS, which provides an extremely high security gateway system.

Initially, the following description describes how a gateway controls access from one side thereof to objects on the other side thereof. In particular, the example describes in detail how the CORBA Naming Server can be adapted very conveniently for use in controlling how objects are published or not across the gateway. However, the same principles can be used in other object infrastructures. In the example, the Naming Server returns an object reference, where one is present, in response to receipt of a object name. This service can be likened to a telephone 'white pages' directory.

The gateway uses only standard features of CORBA and is completely transparent to both client and server ORBs. This means that any CORBA compliant ORB can be used to implement client and server objects which communicate via the gateway. This transparency also means that the gateway is not needed during application development and would only be needed when the application is deployed across firewalls.

Figure 1:
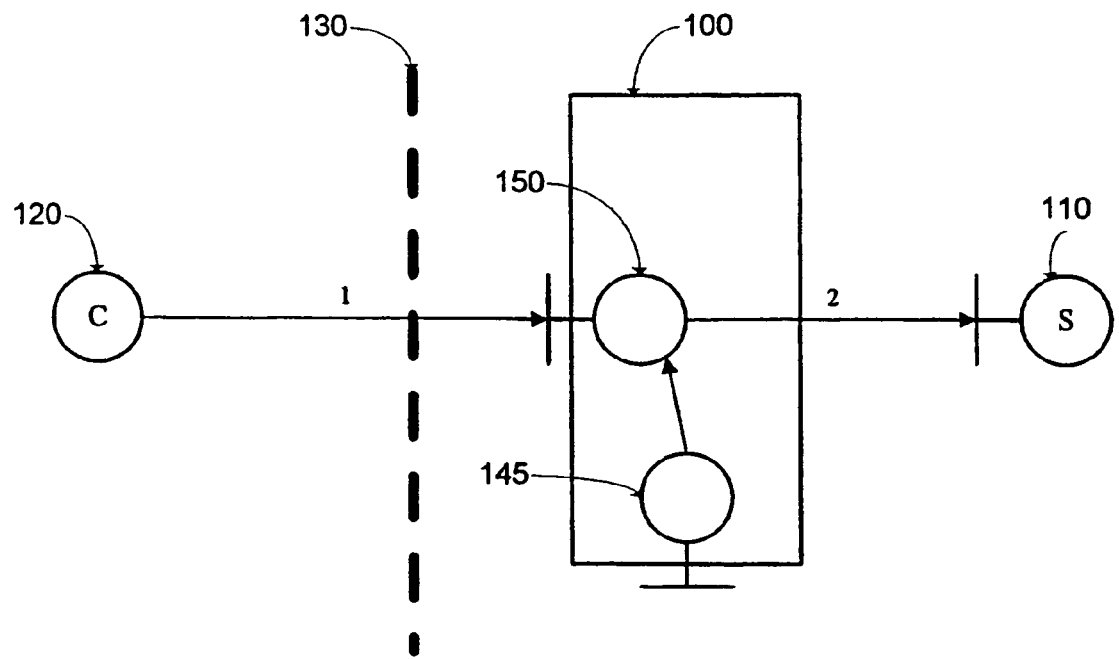
FIG. 1 is a diagram which illustrates an example of making a CORBA object available across a gateway to an external client.

FIG. 1 illustrates, very simply, the situation to be addressed, that being to provide an object gateway 100, which controls the visibility of internal CORBA (IIOP) services to a client 120 on the outside of a firewall or packet filter 130. In practice, the gateway 100 is located on a host computer system, for example a UNIX or Windows NT-based system, and listens on a pre-determined communications port, so that the gateway is able to block attempts to connect to other ports on that host. An administrator 140 wishing to make a service 110 available to the external client 120 creates a proxy 150 for the service, via an administrator interface 145.

The proxy 150 receives incoming invocations and forwards them to the service 110, an object, which is on the other side of, and protected by, the gateway. The proxy 150 shares the same port as any other proxies in the gateway 100. Before an invocation is forwarded to the service 110, the proxy 150 may perform certain checks such as checking that the invocation is type-safe, checking that the parameters are in range and checking that the client is authorised to make the invocation. A proxy 150 may be arranged to check the results of the invocation of the service 110, before forwarding them back to the client 120.

The client 120 is given an object reference to the proxy 150 rather than an object reference to the service 110. Any attempt by the client 120 to use an object reference to the service 110 will fail, blocked by the firewall, because the service 110 is on a host and port number not allowed to receive incoming packets.

One very powerful feature of CORBA is the ability to hand object references between clients and servers as parameters and results. A server can create an object and include a reference to it in the result that it returns to a client. A very well know example is the CORBA naming service "list" operation which returns an object reference to an iterator object in its reply to the client [OMG 97a]. In accordance with the present embodiment, the object reference needs to refer to a proxy running in the gateway, rather than iterator object itself, which would not be available directly through the firewall. This situation is illustrated in the embodiment in FIG. 2, in which the numbering scheme corresponds to that used in FIG. 1.

Figure 2:
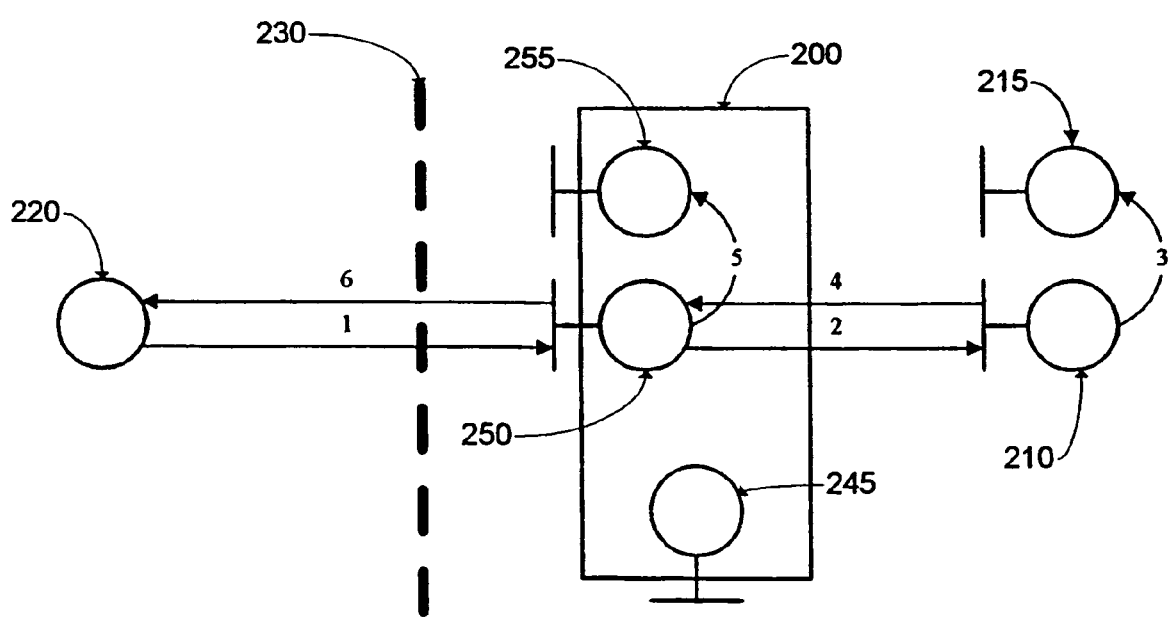
FIG. 2 is a diagram which illustrates an example of a server returning an object reference to a client across a gateway.
Figure 2:
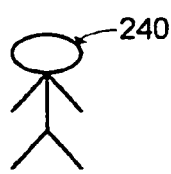

In FIG. 2, the steps are illustrated by numbered arrows which represent operations, which have corresponding steps in the following description. Thus, in the diagram:

1 when an object gateway 200 receives an invocation for the service 210 (for example 'list'), a proxy 250 for the service intercepts the invocation
2 then, the proxy passes it on to the service 210
3 the service 210 processes the invocation and instantiates a further service 215 (e.g. an iterator object)
4 the service 210 returns a response including an object reference to the further service 215
5 the proxy 250: intercepts the response; detects the object reference to the further service 215; dynamically creates an appropriate new proxy 255 for the further service; and
modifies the object reference so that it references the new proxy 255 instead of the further service 215
6 the proxy then forwards the response on to the client 220.

In this way, the gateway 200 makes the further service 215 available to the client 220, via the new proxy 255. Conceptually, one can think of the gateway 200 as detecting the object reference, and replacing it with a reference to a dynamically created proxy.

Whilst this is an effective solution to making the further service 215 accessible, the applicants have appreciated that it may lead to a serious 'garbage collection' problem: the client 220 may never use the object reference, or the further service 215, to which the object reference refers, may be destroyed (e.g. when the client invokes the iterator's destroy( ) operation). In general, the gateway 200, has no way to tell when the new proxy 255 is no longer needed.

Figure 3:
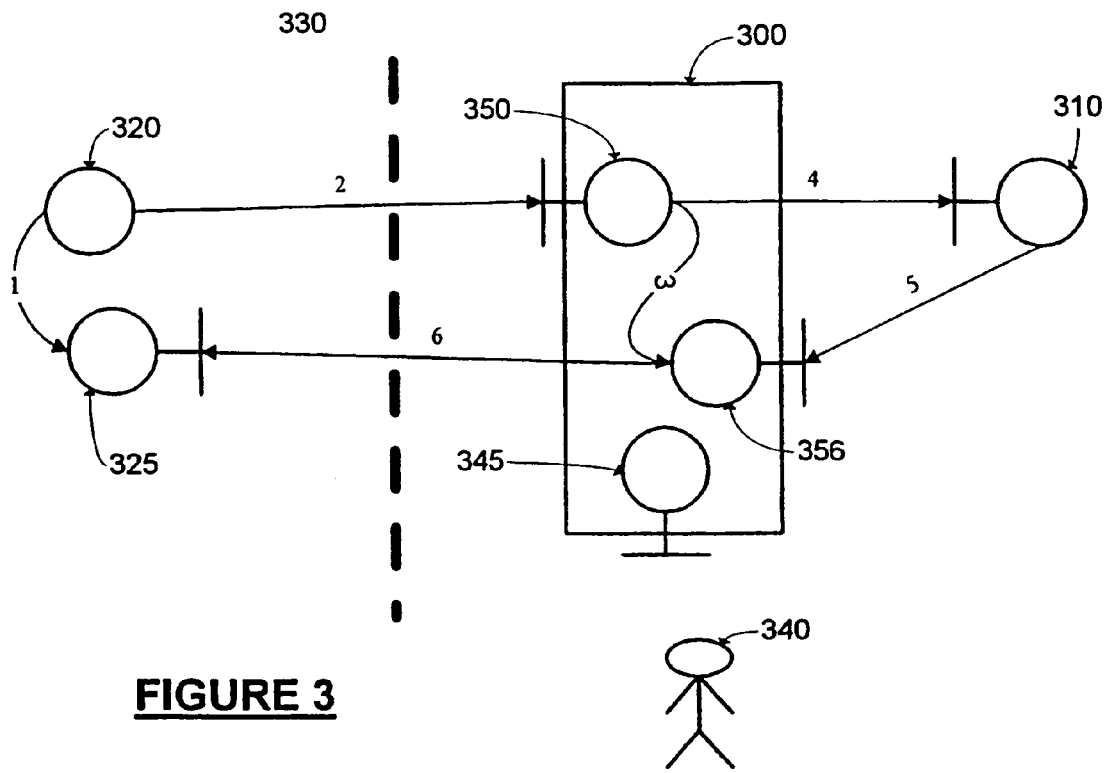
FIG. 3 is a diagram which illustrates an example of a client passing an object reference across a gateway to a server.

FIG. 3 illustrates the equivalent problem which arises when a server 310 receives from a client 320 a reference to a callback object 325. (This paradigm is used in the CORBA Event Service [OMG 97a].) In more detail:

1 the client 320 generates a callback object
2 then client 320 then transmits an invocation to a server proxy 350
3 the server proxy 350 detects the callback reference and generates an appropriate callback object proxy 356
4 the server proxy 350 forwards the invocation to the server 310

5 the server 310 processes the invocation and calls-back the callback object as required
6 the callback proxy 356 intercepts the callback and forwards the callback to the callback object 325.

Again, there is potential garbage collection problem.

Figure 4:
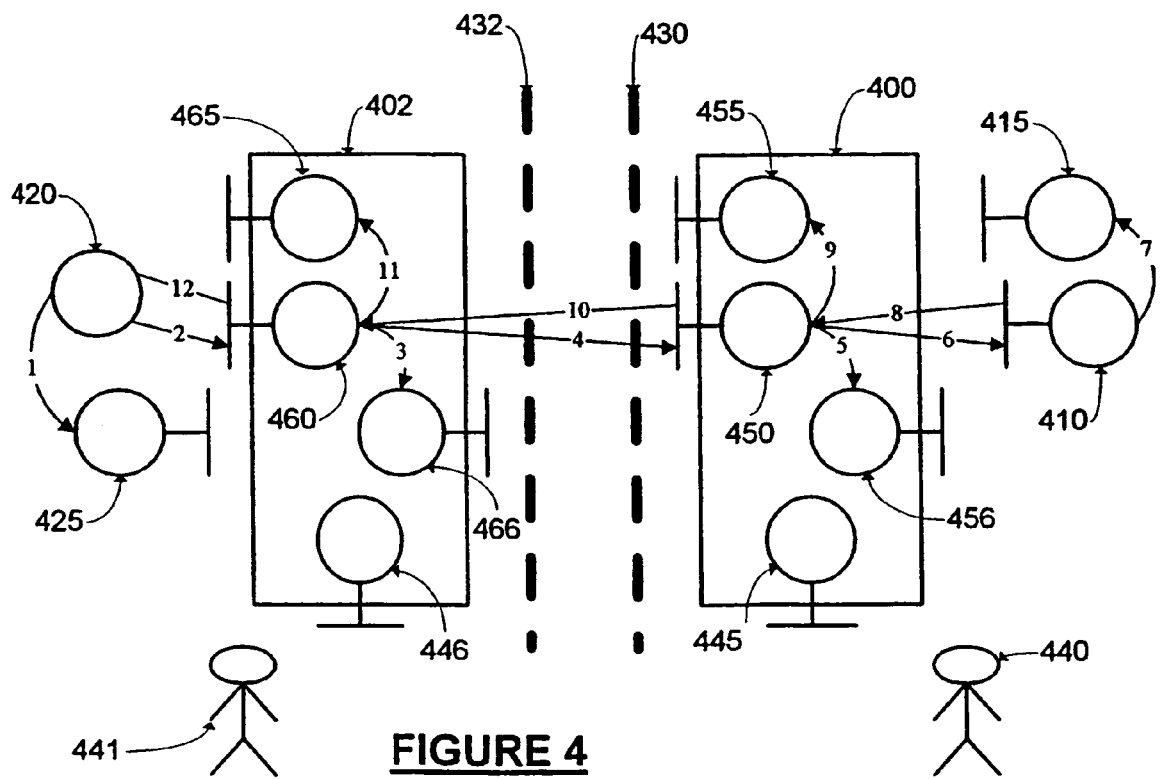
FIG. 4 is a diagram which illustrates an example of a scenario having both client and server-side gateways.

So far the description has assumed that a client is not also behind a firewall. Unfortunately, in most enterprises, it will be. Thus any object gateway needs to provide both a client-side and server-side solution. FIG. 4 illustrates the basic requirements to allow a client 420 and server 410 interaction, in which object references are exchanged freely. The steps which occur are as follows.

1 The client 420 creates a client callback object 425.
2 The client 420 makes an invocation request containing the reference to the client callback object 425. This call is intercepted transparently by a client proxy 460 in the client gateway 402.
3 The client proxy 460 detects the object reference for the client callback object 425 and creates a new client callback proxy 466 for it.
4 The client proxy 460 makes an invocation request replacing the object reference with one for the new client callback proxy 466 created in step 3. The call is intercepted transparently by a server proxy 450 in the server gateway 400.
5 The server proxy 450 detects the object reference in the request and creates a new server proxy 456 for it.
6 The server proxy 450 sends to a server 410 an invocation request replacing the object reference with one for the new server proxy 456 created in step 5.
7 The server 410 creates a server callback object 415.
8 The server 410 sends a reply containing a reference to the callback object 415 created in step 7.
9 The server proxy 450 detects the object reference to the callback object 415 and creates a server callback proxy 455 for it.
10 The server proxy 450 sends a reply containing an object reference to the server callback proxy created in step 9.
11 The client proxy 460 detects the object reference and creates a new server proxy 465 for it.
12 The client proxy 460 sends a reply containing a reference to the new server proxy 465 created in step 11.

Even simple implementations of the above functionality would lead to the build up of a tremendous amount of state in busy object gateways and subsequent garbage collection problems.

Figure 5:
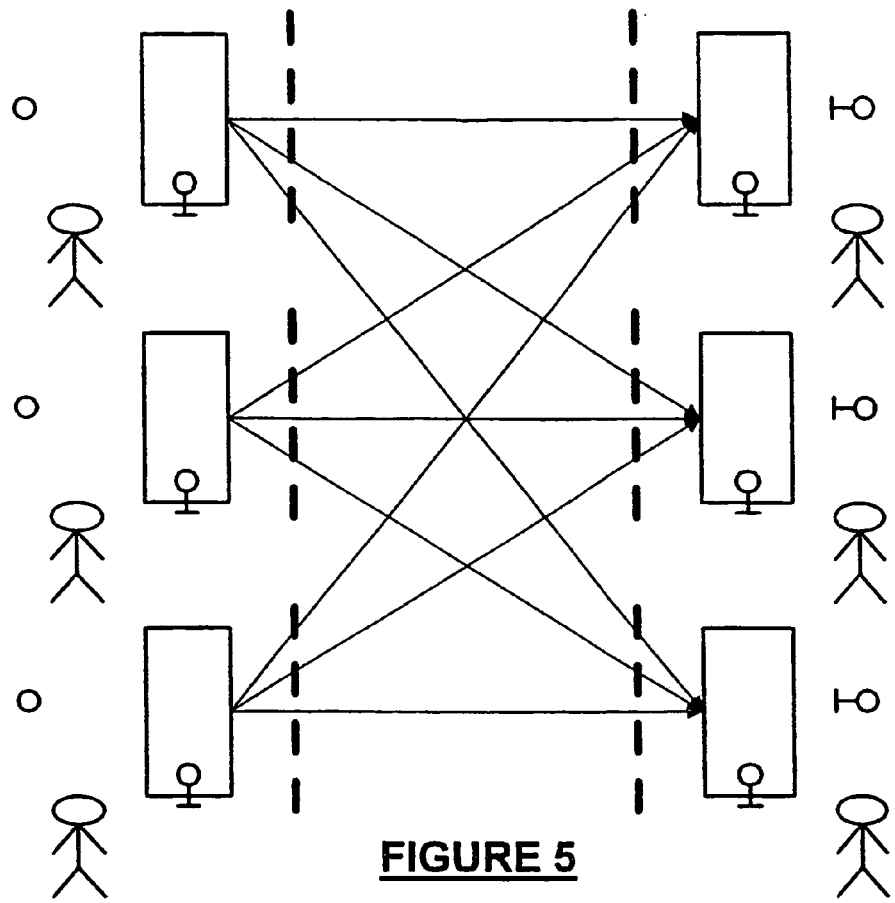
FIG. 5 is a diagram which illustrates multiple clients and servers with respective multiple gateways.

Additionally, there has only been described a single client attempting to invoke a single server. The reality is that there will be many different clients trying to use many different servers, as illustrated in FIG. 5. FIG. 5 illustrates three client gateways interacting with three server gateways.

One way around the problems would be for server gateway administrators explicitly to enable access to each service being made available from their internal network. The applicant's, however, do not believe this is a reasonable requirement to impose on the administrators of all client gateways, since some enterprises may want to allow their users to invoke any service they choose. If this is the policy, it is not reasonable to expect client administrators to anticipate and explicitly enable access to each service their clients might want to use; they will need some way to make their gateways 'promiscuous'. Other client administrators may want to allow access to any service made available by certain business partners, but to exercise tight control over anything else.

Figure 6:
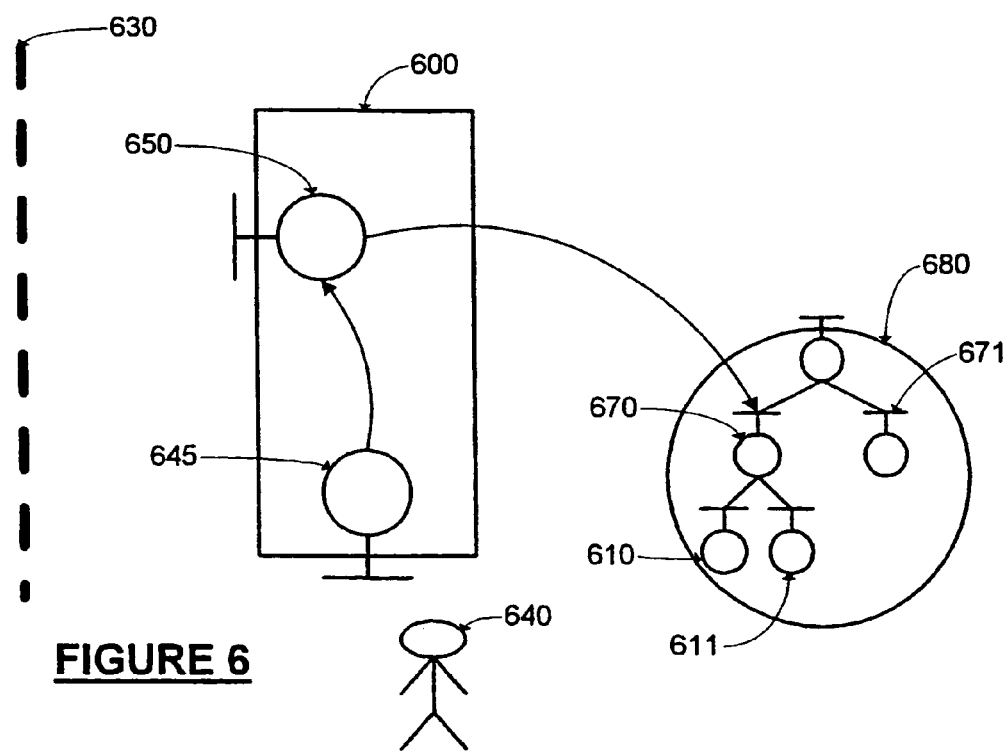
FIG. 6 is a diagram which illustrates an example of using a naming server with a client side gateway.

FIG. 6 illustrates a preferred technique, in which a gateway 600 acts as a server-side gateway providing controlled access to internal services (not shown). An administrator 640 configures the gateway 600, via an administrator interface 645, to include a proxy 650 for a particular 'external' naming context 670 in a Naming Server 680 [OMG 97a] (or a trader lookup interface [OMG 97a]). The Naming Server also includes an 'internal' naming context 671. The external naming context 670 includes object references, 610 and 611, for all internal services that are accessible from outside of the gateway 600. The internal naming context 671 includes object references (none shown) for all objects that are accessible on outside of the gateway. In accordance with the present embodiment, the external naming context 670 is known as the a "bootstrap point". Hereafter, it will be assumed that a Naming Server Context is used, but the same principles apply to the use of trading technol gy.

Once the gateway 600 is configured to include a proxy 650 for a naming context 670, that context and everything it contains becomes visible to external clients (not shown). Clients can browse the naming context and retrieve object references from it. The gateway 600 thus acts as a transparent proxy for any object (not shown), which is retrieved from the Naming Context Furthermore, the gateway 600 acts as a transparent proxy for any object which is retrieved by invoking the object, or any object handed by a client as a parameter to the object. This means that the administrator 645 must be confident that the services which are available in the external naming context do not introduce trap doors by handing out object references to services which should not be made available to external clients. Additionally, extra filtering technology can be used to ensure the gateway 600 can only act as a proxy for services on certain hosts.

If a service is removed, the respective object reference is deleted from the external naming context and the gateway ceases to act as a proxy for that service and any object references obtained from that service.

Conceptually, each time the gateway sees a request or a reply with an object reference, it creates a proxy for the object and replaces the object reference with one for the proxy. The administrator 645 bootstraps the process by choosing the bootstrap point and creates the bootstrap proxy.

Choosing the bootstrap point controls what is available through the gateway. The gateway's default behaviour is to proxy all objects obtained directly or indirectly from a bootstrap proxy object. An object is obtained indirectly from a bootstrap proxy object if its reference was obtained from a third party whose object reference was itself obtained directly or indirectly from the bootstrap proxy object. The gateway also acts as a proxy for all objects passed as parameters in requests to objects for which it is acting as proxy (i.e. callback objects).

In the preferred gateway implementation, proxies are not created each time an object reference passes through the gateway. The algorithms minimise the state which the gateway needs to hold, so that many object references can pass through the gateway without internal state changes occurring. This improves the efficiency of the solution.

By default, the gateway proxies are implemented using the Dynamic Invocation Interface and Dynamic Skeleton Interfaces defined in [OMG 95]. This ensures that all messages relayed by the gateway are correct IIOP messages and that both requests and replies are type-safe. Alternatively, the information used to create the proxies may be used to dynamically generate a template for a type-specific proxy, as will be described in more detail below. Neither of these techniques, however, guarantee the application semantics will not be violated (e.g. operations called in the wrong order). Application specific proxies can be provided to support this, as will be described in more detail below.

Figure 7:
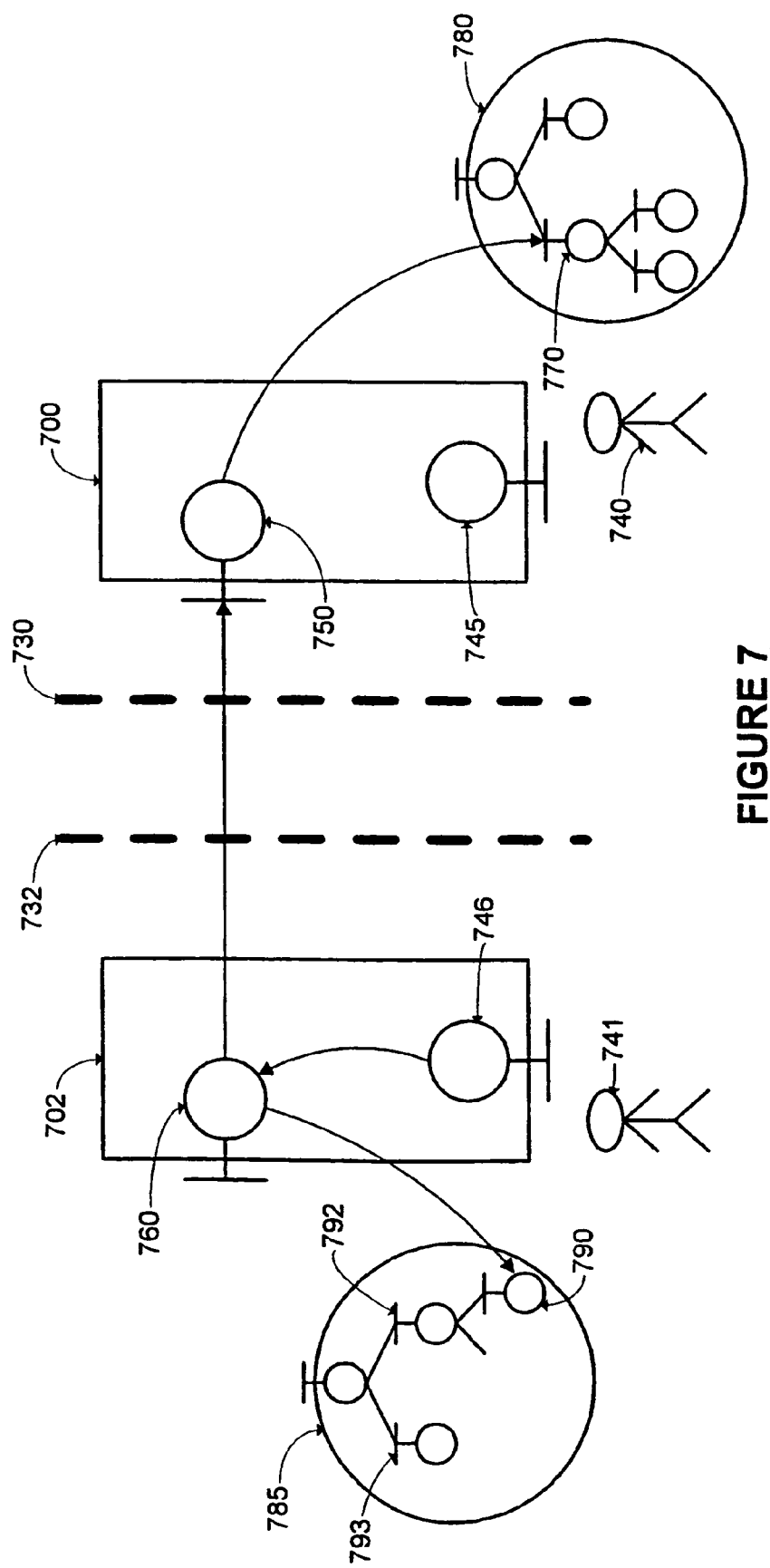
FIG. 7 is a diagram which illustrates a client according to the example in FIG. 6 inter-operating with a server.

FIG. 7, illustrates one way in which a client gateway 702 inter-operates with a server gateway 730 according to the preferred embodiment. In this case, it is assumed that a client administrator 741 wants to make available to his users all services available from the server gateway 730. This is achieved by creating a bootstrap proxy 760 for the Server gateway's external naming context 770 and placing the object reference 790 for that proxy in a client side naming service 785 or trader, under an internal naming context 792, so that it is accessible to clients. This causes the client gateway 702 transparently to act as a proxy for the server gateway external context 770, in the server's naming service 780, or an object (not shown) retrieved from this context. Furthermore, the client gateway 702 acts as a transparent proxy for any object which is retrieved by invoking the object, or any other object handed by the client as a parameter to the object. This means that the administrator must be confident that the clients do not introduce trap doors by handing out object references to services which should not be made available externally. Extra filtering technology can be used to allow only proxies for services and callback objects on certain hosts, but this may not be an issue if the administrator has configured the object gateway so that it interacts only with the gateways of "trusted" business partners.

Although not shown in FIG. 7, the client gateway 702 could also act in the role of a server gateway, making services available to external clients, by using an external context 793 of the naming server 785. Similarly the server gateway 700 could also act as a client gateway for its internal clients.

Figure 8:
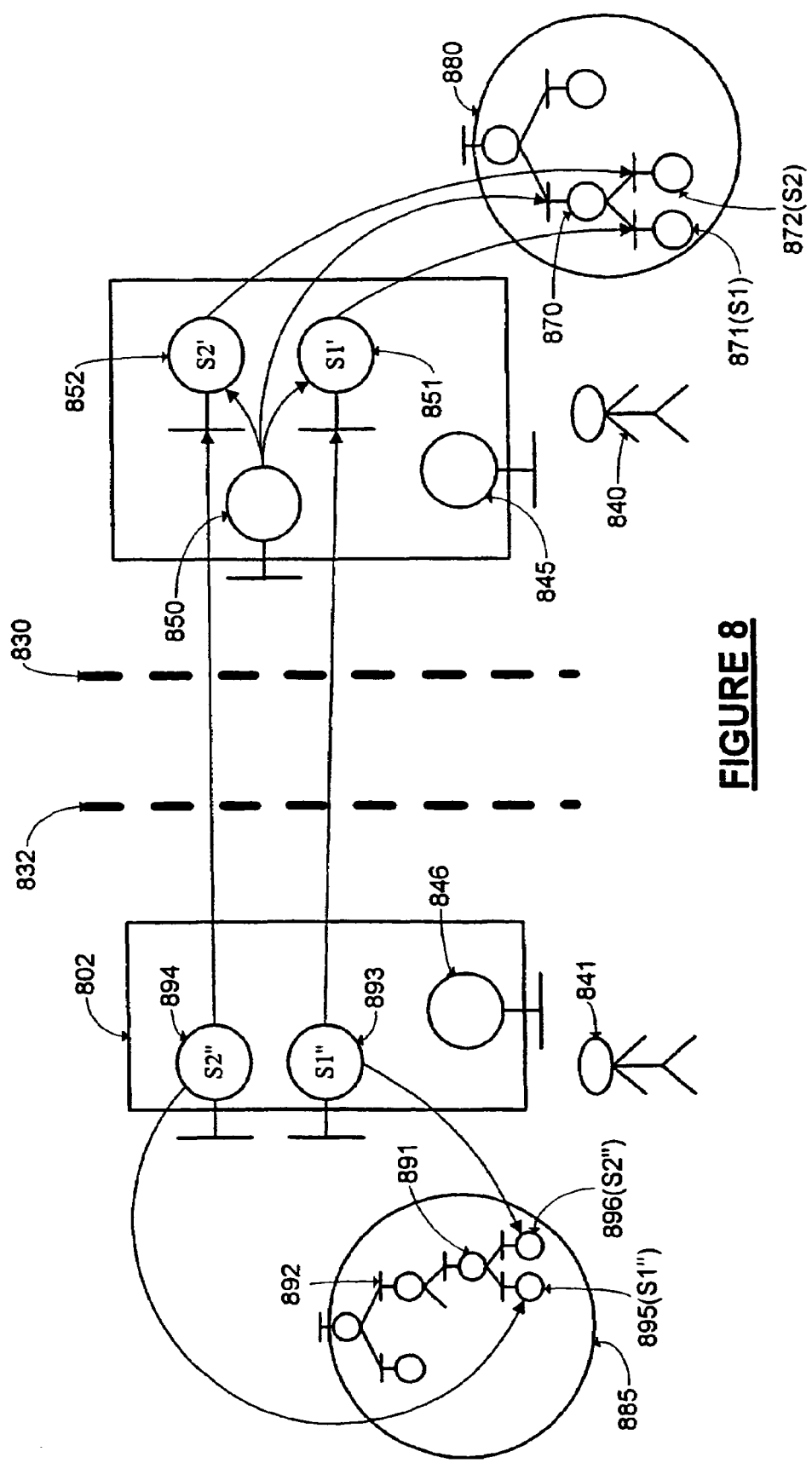
FIG. 8 is a diagram which illustrates an example of making only selected services available across a gateway.

Some client administrators may not want to make all the services available from a particular site. This situation is shown in FIG. 8. Here, the client administrator 841 wishes to allow access to objects S1 and S2 (not shown) only. So, the object references, 871 and 872 respectively (S1 and S2), for these objects are chosen as the bootstrap points, rather than the external Naming Context 870. First, the administrator 841 creates a context 891 in the local naming server 885 under the internal naming context 892. Next he browses the server naming service 880 to retrieve the object references, 851 and 852 respectively, for the relevant proxy objects S1' and S2' and creates client side bootstrap proxies, 893 and 894 respectively (S1" and S2"), for these. Finally, the object references (895 and 896) for S1" and S2" are inserted into the local naming service 885 under the appropriate context 891. The administrator's users can now retrieve object references from their local naming service 885, which allows them to access S1 and S2, but no other services.

Figure 9:
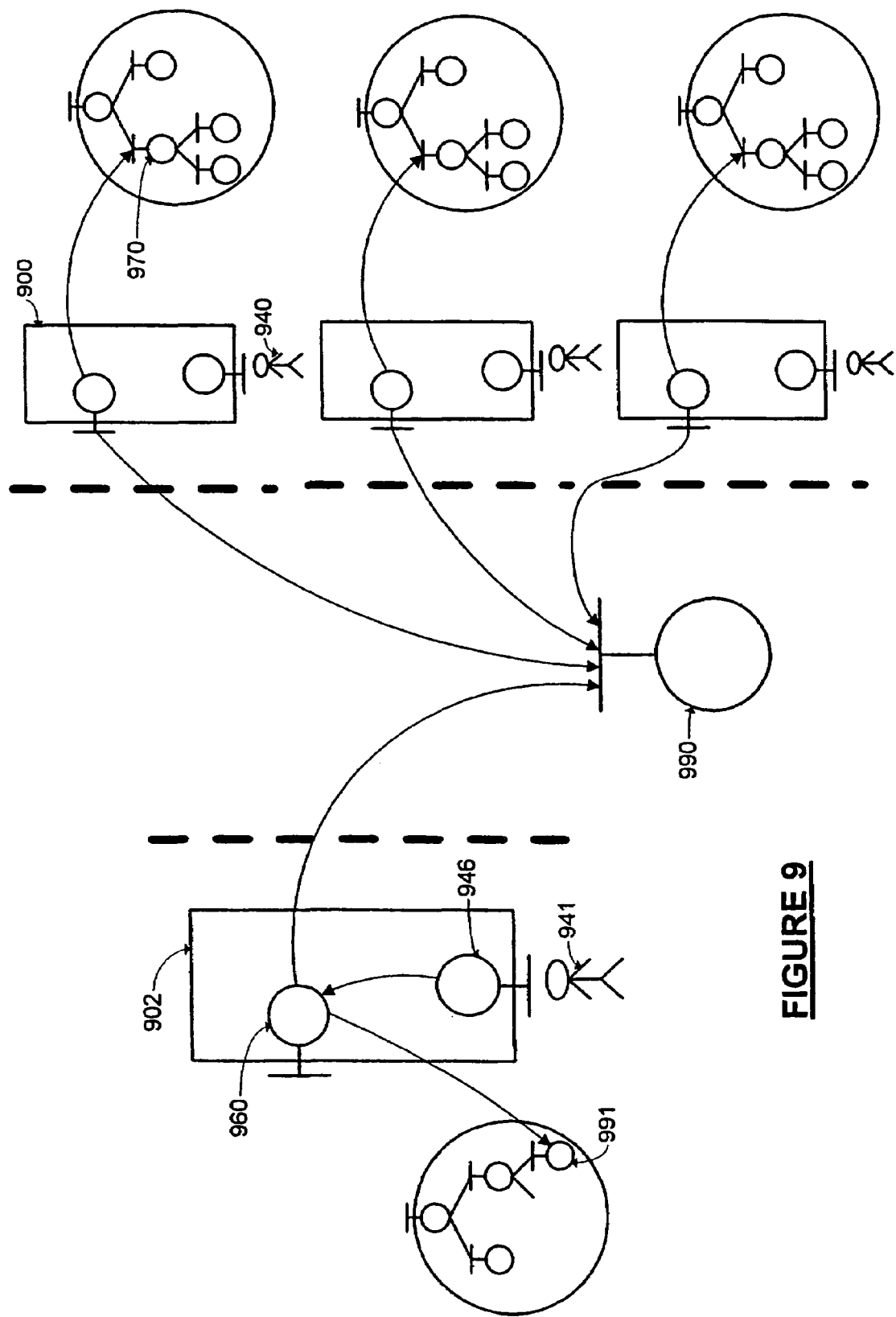
FIG. 9 is a diagram which illustrates an example of a gateway operating in promiscuous mode.

Some administrators may want to allow their clients to access any service they choose (promiscuous mode). As shown in FIG. 9, a convenient way of doing this is to create a bootstrap proxy 960, and corresponding bootstrap point 991 having an object reference, for some public directory 990 (e.g. trader or naming service) in which server administrator 940 or some other party had already registered their gateway's 900 external naming service 970 or trading service. Then, the gateway 902 acts as a proxy for any service retrieved from the public directory 990 and in turn any service whose object reference was obtained as a result of accessing the service. Thus, choosing a public "directory" service as the bootstrap point makes the gateway promiscuous.

In FIG. 9, the gateway 902 is entirely transparent to clients and servers. It is also transparent to other instances of the gateway. This means that gateways can be daisy chained, if a request needs to traverse multiple firewalls. This will be necessary if an enterprise uses firewalls to partition its network internally and different firewalls to restrict access to the Internet.

Security requires the integration of secure communications (authentication, confidentiality, etc) and secure platforms, for example one running under a trusted operating system. Secure communications makes it difficult for an attacker to cause harm by intercepting a message as it passes through the network. A secure platform makes it difficult for an attacker to cause harm by gaining unauthorised access to data stored on that platform (on a disc, in a process etc).

The facilities provided by VVOS to prevent information leakage are ideal for building a gateway to provide controlled access to information and services in Internet and Intranet based environments. Note that the installation still makes use of firewall technology such as packet filters. An implementation using a trusted operating system is complementary to conventional firewall technology, not an alternative. Its value is that the gateway machine that is visible through the firewall is much more robust to attack than a conventional Unix or Windows NT machine.

A preferred embodiment of the present invention implemented on a secure operating system will be described in detail below.

In order for an administrator to configure the present gateway, the gateway has an Interface Definition Language (IDL) [OMG 95] defined management interface (not available to external clients). This allows an administrator to change the configuration of the gateway. Example administrative operations include: changing what operations are available on an object to external clients and withdrawing the rights to access external services from internal users. The management interface also allows the administrator to see what services have been made available to external users and internal clients.

The present gateway also provides an API so that application specific proxies can be incorporated into the gateway. Application specific proxies can use IDL generated stubs and skeletons and allow programmers to embed knowledge of the applications' correct semantics (a simple example is restricting the range of parameters).

Figure 10:
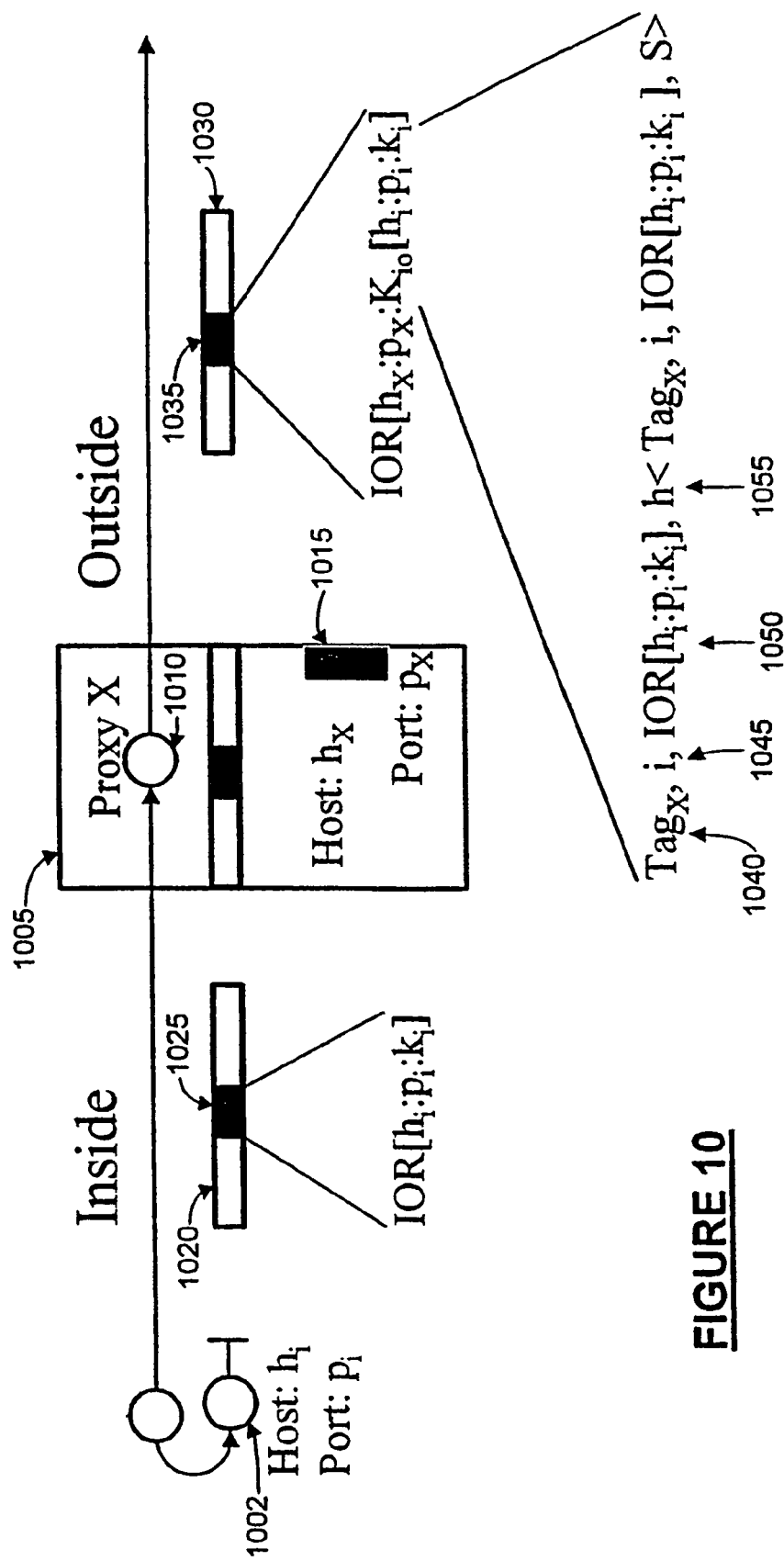
FIG. 10 is a diagram which illustrates how an object reference is modified as it crosses a gateway from the inside to the outside thereof.

FIG. 10 is a diagram that illustrates the mechanism for mapping an object reference 1025 in an invocation which originates from a host on the inside of a gateway 1005 located on a host hx to the outside of the gateway. The object reference 1025 refers to an object 1002, also located on the inside of the gateway. The gateway includes a proxy 1010, or interceptor, for a message 1020, which contains the object reference 1025. In practice, the message 1020 will commonly be an object invocation for a remote object (not shown), which includes an object key, an operation name, and respective arguments (the details of which are beyond the scope of the present description). The object reference 1025 is included in the arguments of the invocation.

The proxy 1010 recognises the presence and location of object reference 1025 in the message 1020 in one or more of a number of different ways, depending on how the overall system is configured. One way is that there may be a pre-defined location for an object reference in a message, and the proxy 1010 is programmed to look in that location for an object reference. An alternative way is to provide an external database which holds information about the positions of object references in different types of message. In this case, each proxy receiving a message would need to refer to the database in order to determine where to look in the message in order to determine whether an object reference were present A further way of detecting the presence of an object reference would be for a message to be self-describing, to the extent that it includes information, for example an index portion, which could be interpreted by a proxy to determine the presence of an object reference. Clearly, one or more of these or other similar techniques could be implemented by the skilled person in order to determine the presence of an object reference in any message.

As illustrated, the object reference 1025 comprises (in the object key) an IOR[hi: pi: ki], where h, p and k represent host, port and object key values respectively for the referenced object 1002.

The proxy 1010, receives the message 1020, extracts the object reference 1025 therefrom and maps the object reference to form a modified object reference 1035. The modified object reference 1035 is contained in a forwarded message 1030.

As shown, the modified object reference includes a new host name, hx, a respective port number, px, and an object key, Kio. A detailed description of a mapping function, mapio, used to generate the modified object reference, is provided below. The object key, Kio, includes a number of features, as follows:

- a name (or revocation) tag 1040, which is unique to the proxy 1010;
- an identifier (or location tag) 1045, which indicates from which side the object reference originated, which in this case is from the inside (i);
- an IOR 1050, which is the same as the original object reference 1025; and
- check data 1055, which is a hash, or signature, of the name tag 1040, the identifier 1045, the IOR 1050 and a secret S.

When the message reaches a remote object, the nature of the information in the message indicates to the remote object that an object reference (the modified object reference 1035) can be used to initiate an invocation of the object 1002, by opening a connection with host, hx, on port, px, and sending an invocation including object key.

Figure 11:
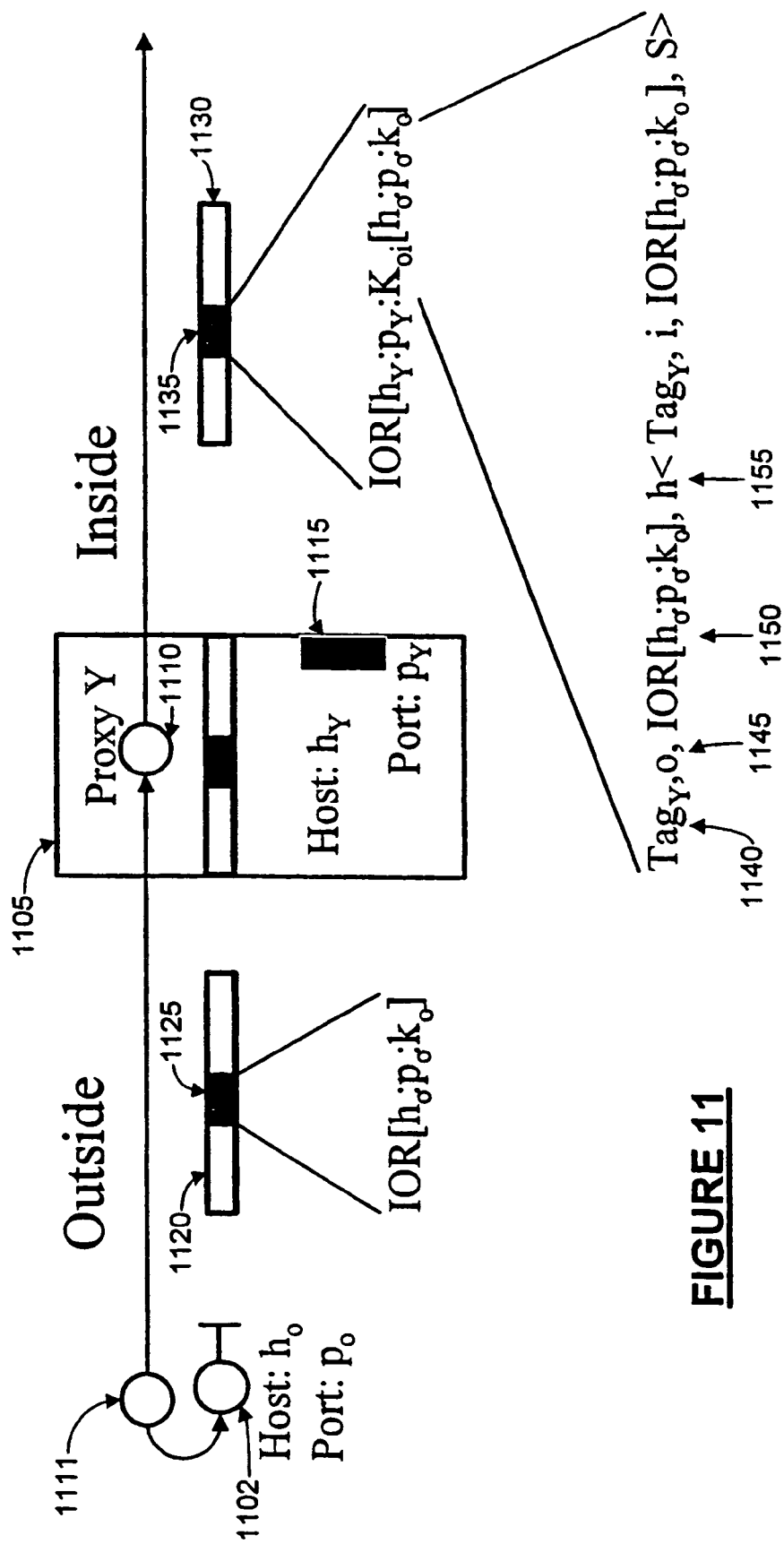
FIG. 11 is a diagram which illustrates how an object reference is modified as it crosses a gateway from the outside to the inside thereof.

FIG. 11 is a diagram that illustrates the mechanism for mapping an object reference 1125 which originates from a host 1111 on the outside of a gateway 1105 located on a host hy to the inside of the gateway 1105.

The mechanism is similar to the one in FIG. 10, and common features are labelled accordingly, except the labels in FIG. 11 are of the form 11xx, rather than 10xx.

The significant difference is that the mapping function for this mechanism, mapoi, generates a modified object reference with an object key, Koi, which includes an identifier 1145, which specifies outside, o, rather than inside. Again, the mapping function, mapoi, is described in detail in detail below. A detailed description of object invocations, which pass object references in both directions, is also provided below.

Figure 12:
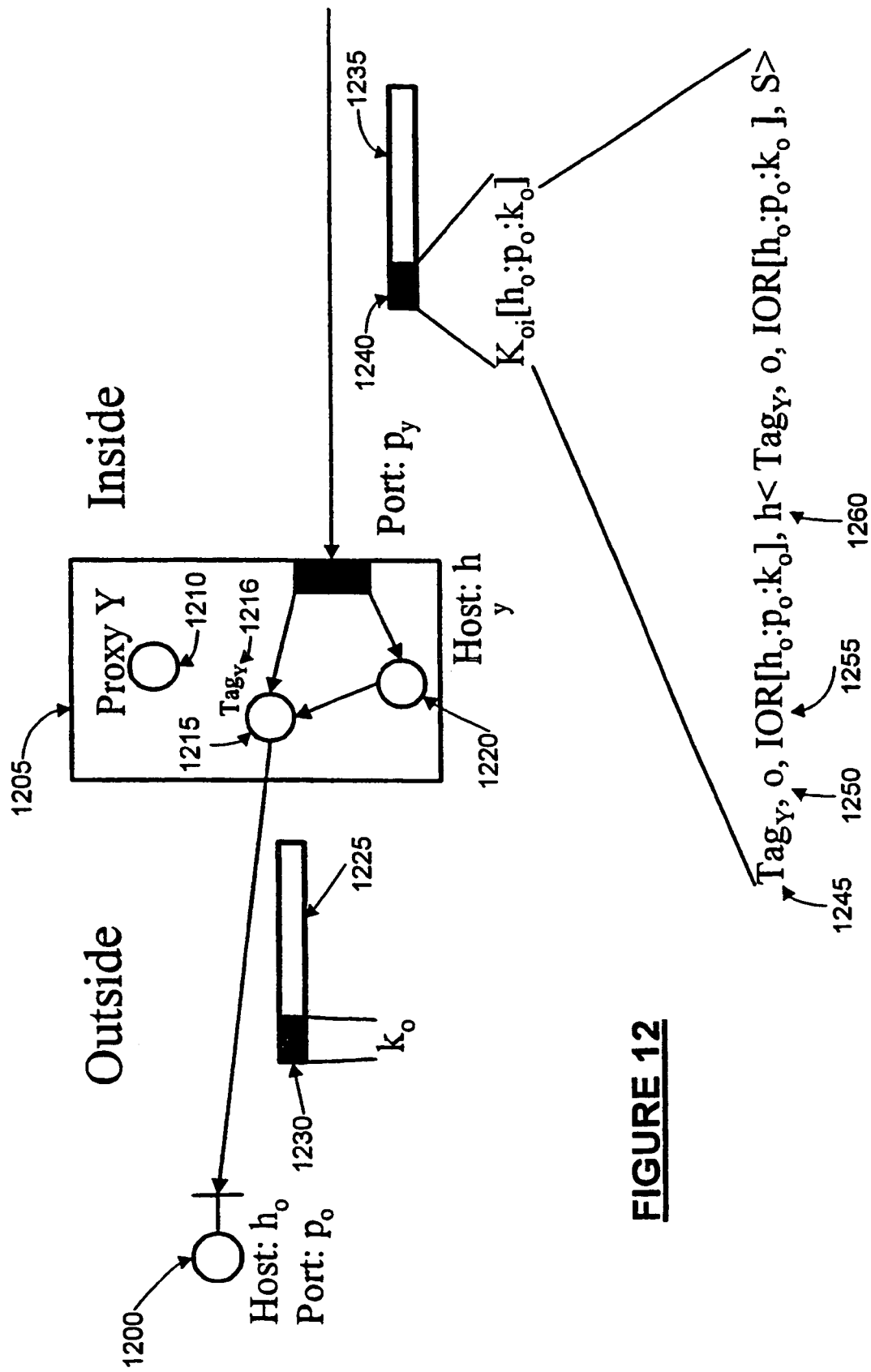
FIG. 12 is a diagram which illustrates how a gateway can dynamically generate a proxy for an object.

FIG. 12 is a diagram that illustrates the mechanism used by a gateway 1205 for dynamically receiving an object invocation 1235 containing an object key 1240, dynamically activating a proxy 1215 and forwarding a modified message 1225.

The object key 1240 is one that was formed during a mapping as described above with reference to FIG. 11, and includes a name tag 1245, an identifier 1250, which in this case is an "o" to indicate that the object reference originated on the outside of the gateway, an IOR 1255 to the destination host 1200, and check data 1260. The invocation is received on a port, py, of the host, hy.

The gateway 1205 is configured firstly to attempt to locate a proxy for the object referenced in the object key 1240 of an object invocation 1235 received on the port py. If no proxy is located, the gateway is configured then to pass the object key 1240 received on port py to an activator function 1220, to dynamically activate the appropriate proxy 1215.

The activator 1220 first checks the validity of the key by re-computing the hash value and checking that it matches the hash value 1260 in the key 1240. If this succeeds, the activator checks that the tag 1245 is valid. For tags created by a naming proxy, as explained with respect to FIG. 13, this is achieved by interpreting the tag as a name and attempting to resolve the name. If any of the checks fail, the proxy is not activated and the message is not forwarded. In the case of a CORBA invocation, an exception is returned to the invoker.

The activator 1230 determines the type of proxy required by inspecting the IOR 1255 of the destination object, by invoking the destination object 1200 to request a description of its type, or some combination of these two methods. If the gateway has a template for the required type, the activator 1230 uses this to instantiate the proxy 1215. If there is no specific template, the activator may either use a template for a generic proxy, or it may generate the specific proxy dynamically. Dynamic proxy, or interceptor, generation is described in more detail below. As has already been described, it is advantageous to enact at least some of the proxy activation steps in advance of receiving the invocation, to reduce the delay caused by the activation process.

When the activator 1220 instantiates the proxy 1215, it refers to the tag 1245 in the incoming key 1240 and embeds the tag value Tagy in the new proxy instance 1215. Tag values may be used to selectively delete proxies.

Once the proxy 1215 has been generated, it processes the invocation, as will be described in more detail in relation to FIGS. 14 and 15, and forwards an invocation 1225 to the destination object 1200.

Figure 13:
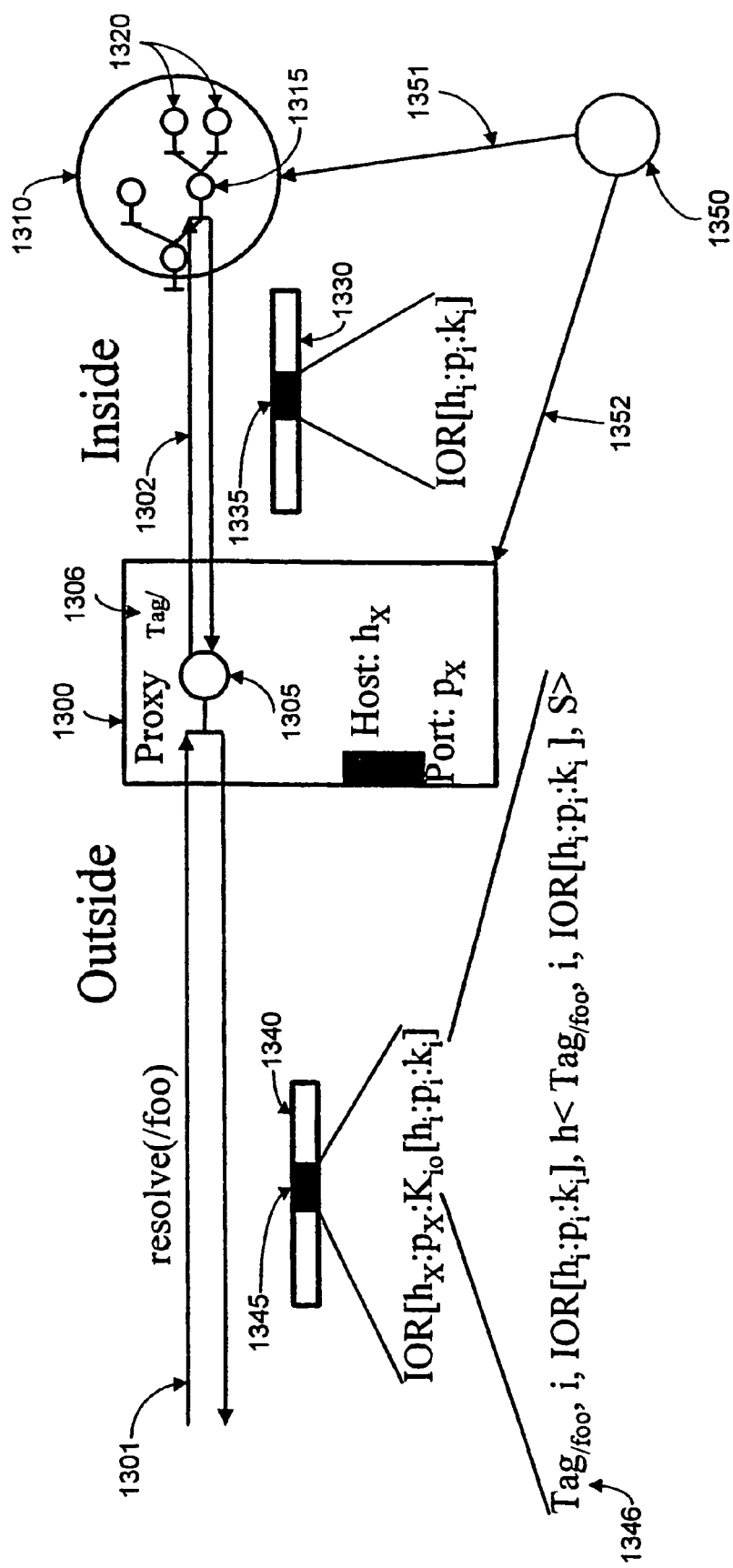
FIG. 13 is a diagram which illustrates how name tags can be used to control object availability.

FIG. 13 is a diagram that illustrates a mechanism for locating, or resolving, object references 1320 across a gateway 1300.

The diagram shows an incoming message 1301, which is a request to resolve an object name, using a naming service 1310 in CORBA. In effect, the naming service 1310 returns an object reference in response to an object name. A similar mechanism can be used by other naming services, traders or object locators in a CORBA system or in other systems.

The message 1301 is received by a naming service proxy 1305, which is configured to forward all resolve requests in messages 1302 to an external context 1315 defined in the naming service 1310. The external context 1315 is an access point in the naming service for all requests from the outside of the gateway 1300.

Any objects that are available from outside the gateway 1300 have an entry 1320 in the external naming context 1315 and can thus be resolved. The result of a successful resolve request is the return by the naming service 1310 to the proxy 1305 of a message 1330, including an object reference 1335 for the named object. The proxy 1305 forwards a respective message 1340 to the requestor. The naming service 1310 generates an exception for unsuccessful resolve requests, resulting from there being no respective object entry below the external context 1315. Again, the proxy 1305 forwards the exception to the requester.

In forwarding the message 1330 for a successfully resolved request, the proxy 1305 extracts the object reference 1335 and generates a modified object reference 1345. The modified object reference 1345 includes specific host and port details for the gateway and an object key comprising a name tag 1306, an identifier, an IOR and check data, as explained above with reference to FIG. 10.

The naming proxy 1305 contains its own name tag 1306 "Tag/" and extends this with the name being resolved "foo", to create a new tag 1346 "Tag/foo", in order to permit control at the level of individual exposed services. The tag effectively names an individual available object entry in the naming service 1310.

An administration service object 1350 may remove an available object entry 1320 from the external context 1315 of the naming service 1310. This disables the activation of proxies by the use of any reference containing the tag that names the removed entry, as explained above with reference to FIG. 12. The administration service object 1350 also instructs 1352 the gateway to remove all (or any) active proxies with the tag so that any further invocation attempts are directed to an activator (not shown) which performs the tag validation and rejects the invocation.

Figure 14:
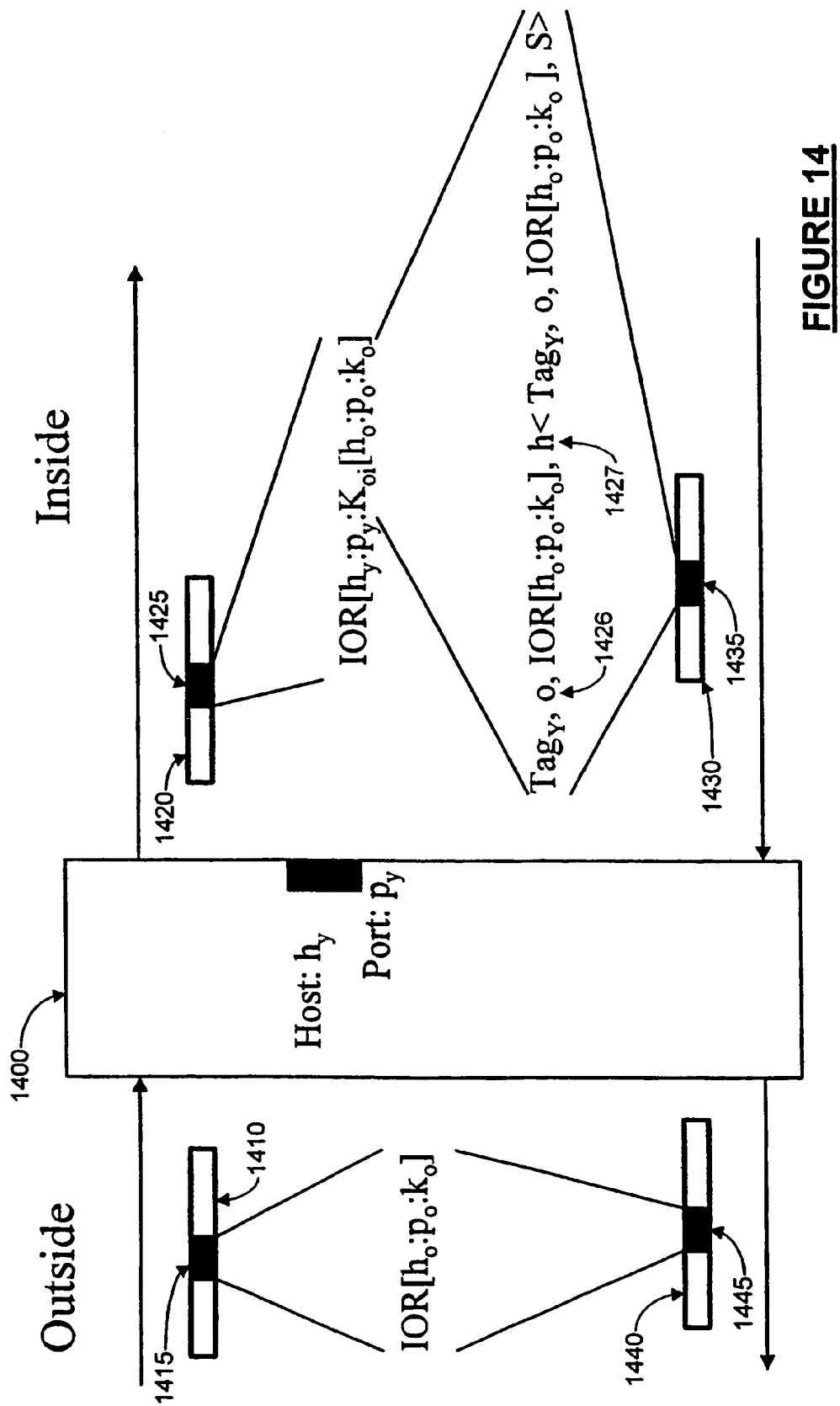
FIG. 14 is a diagram which illustrates how location tags, or identifiers, can be used to determine how an object reference should be mapped.
Figure 15:
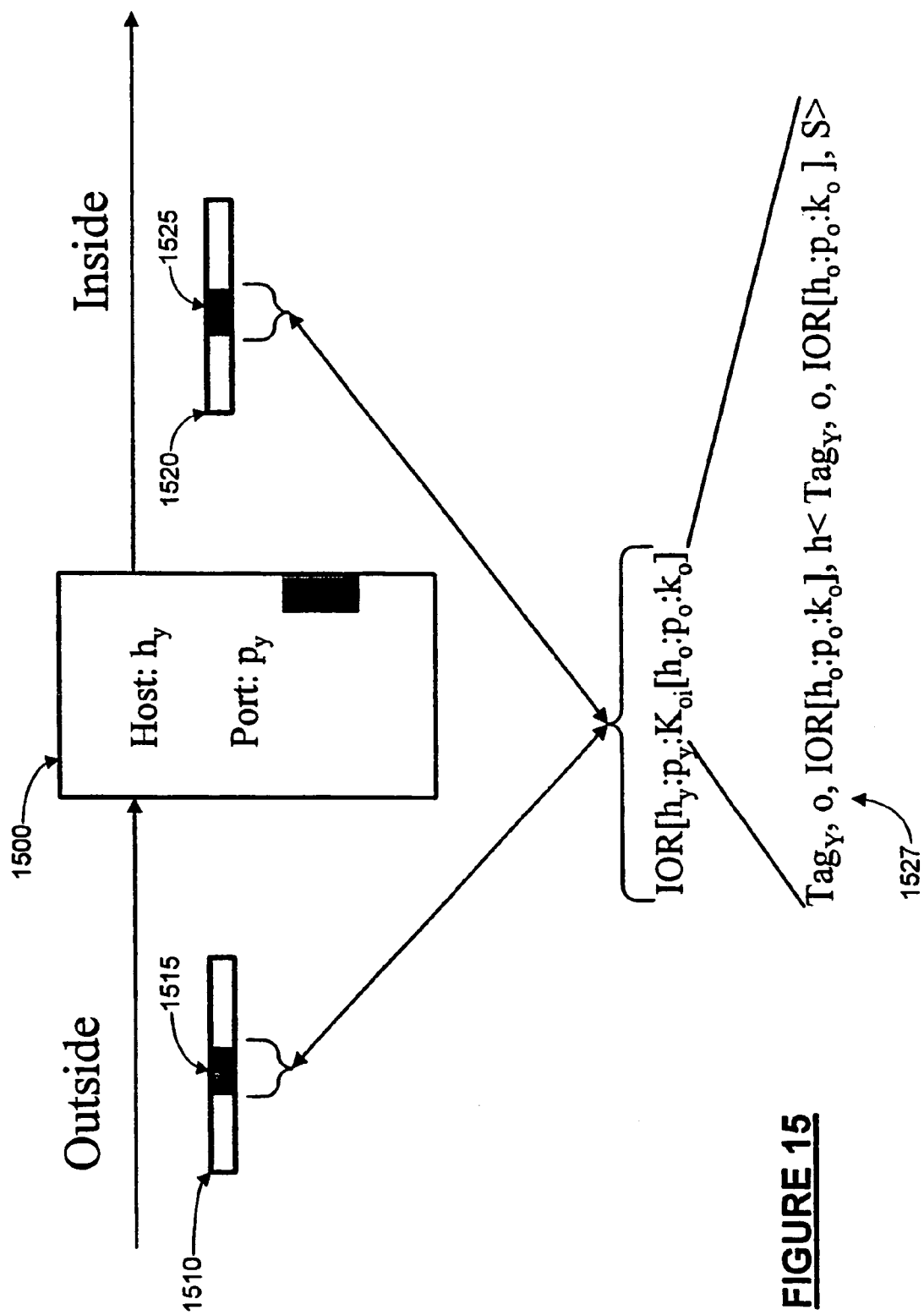
FIG. 15 is diagram which also illustrates how location tags, or identifiers, can be used to determine how an object reference should be mapped.

FIGS. 14 and 15 are diagrams which illustrate two examples of the use of identifiers, or location tags.

FIG. 14 illustrates the case where an object reference 1415 is passed in a message 1410 from the outside of a gateway 1400 to the inside. The gateway 1400, using the mapoi function, modifies the object reference 1415 to form a modified object reference 1425, which is forwarded on in a message 1420.

The modified object reference 1425 includes, among other things, an identifier 1426 and heck data 1427.

If a message 1430, including the modified object reference 1435, is received by the gateway 1400, from the inside thereof, the gateway uses the mapio function on the check data 1427 to verify the contents of the object key, Koi, by repeating the hash operation.

In the example shown, the gateway 1400 verifies the contents of the modified object key. Further, from the identifier 1426, the gateway 1400 recognises that the object reference originated from the outside of the gateway 1400. Thus, the gateway 1400 'un-modifies' the modified object reference 1435, rather than modifying it again, by simply extracting the original object reference 1415, and forwarding it as an object reference 1445 in a message 1440.

FIG. 15 illustrates the case where an object reference has previously been modified by crossing from the outside to the inside of a gateway 1500, to form a modified object reference 1515. Somehow, for example by an out of band method such as email, the modified object reference 1515 ended up back outside the gateway 1500. When the modified object reference 1515 is passed in a message 1510 from the outside of the gateway 1500 again, the gateway establishes, from the identifier 1527, that the object reference originated from the outside. As a result, the gateway 1500 determines that the object reference 1515 does not need to be modified again, and the reference simply passes through without being mapped.

Some of the advantages of the present invention will now be considered.

In accordance with embodiments of the present invention, gateways can be daisy-chained. In other words, object reference can cross multiple gateways, even when a gateway has no knowledge of the object that is referenced, and an invocation of the referenced object can pass back through the gateways. This is a result of the present invention being transparent to users and system administrators alike.

The detection and replacement of object references embedded in messages means that access control does not depend on end-to-end encryption or authentication.

The gateways (or their proxies) appear to be the real "clients" and "servers" to those accessing them.

Other features and advantages of the present invention will become apparent to those skilled in the art of distributed systems on reading the present description.

It will be appreciated that the examples described above generate a modified object reference which includes the original object reference. This has the benefit of making the protocol self-contained, to the extent that an original object reference can always be extracted from a modified object reference purely on the basis of the modified object reference. However, there are other ways in which the same effect can be achieved. For example, the object gateway itself might incorporate a pointer into a modified object reference, which points to a table or database maintained by the gateway in which all received, original object references are added. In this way, an original object reference may be recovered by using the pointer in the modified object reference to find the original object reference in the database. An advantage of this is that the modified object reference can be shorter, since is does not acquire a full, new 'original' object reference each time it crosses a gateway. This can be advantageous when many gateways are to be traversed. However, a disadvantage is that the object gateways need to maintain tables or databases, which add to complexity and potential garbage collection problems when object references are not used.

There now follows a detailed description of an implementation of the features introduced above.

In FIGS. 16 to 23, except for a trusted relay process (TR), the labels follow a convention and are of the form sF[L]. s is a letter (x or y) indicating the type of service the component handles. F specifies the function of the component: C for client, S for server, Ii for interceptor for inbound invocations, Io for interceptor for outbound invocations, IR for interface repository and IRI for interface repository interceptor. The L suffix indicates the object locator for the component. Some components are given multiple labels, this indicates that the component performs several functions, and that these functions could be separated.

TCP connections, which are represented as black arrows, indicate the direction in which a connection request is sent. The arrow head is at some port that is listening, the tail of the arrow is where the connection request occurs.

The ports are coded to indicate how exposed they are to the outside of a gateway (i.e. the less trusted network, typically the open Internet unless the gateway is deployed at an internal organisational boundary). Black ports are directly exposed—these occur on the 'outside' face of a TR, and on external components to which the gateway connects. External requests can connect directly to black ports. White ports are indirectly exposed—these are the ports to which the relay connects in response to a connection from outside. External requests cannot connect directly to white ports, due to a security feature such as a firewall. Any connection with its tail on the 'inside' face of the trusted relay must have its head at a white port. Hatched ports are not exposed to the outside and connections to them can be made only from 'inside' components, again, as a result of a security feature such as a firewall. On a host supporting sensitivity labels, the black and hatched ports would typically have incomparable labels. The white ports would typically have the same labels as the hatched ports, but would be effectively accessible from the outside, so would need particular attention in any security analysis.

Messages, or data packets, travelling over TCP connections are represented as thin black arrows, indicating the direction of transmission of a message, and have a respective number in a circle to indicate the message order, which has an accompanying description herein. Double-headed, white-filled arrows represent communications pipes between processes.

Figure 16:
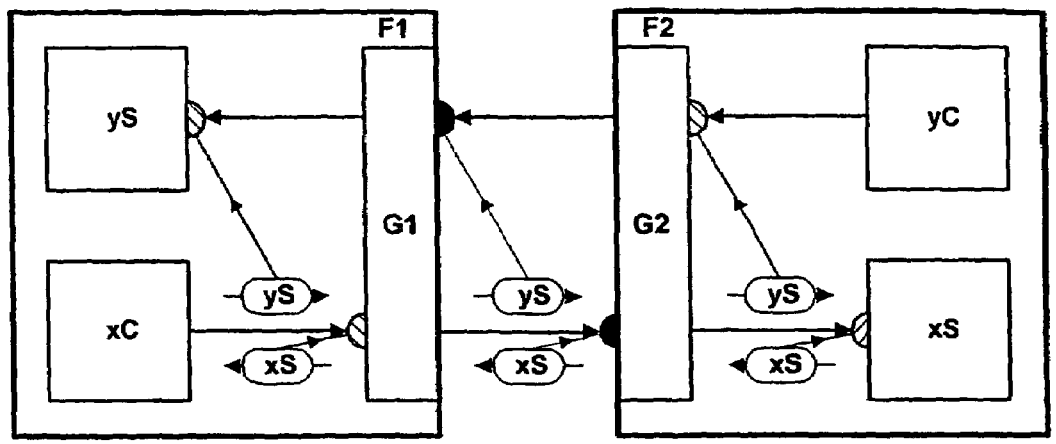
FIG. 16 is a diagram which illustrates a basic scenario in which a client and a server are separated by client and sever gateways.

FIG. 16 illustrates a basic scenario.

In FIG. 16, a client xC inside one firewall, F1, wishes to invoke a server xS inside a different firewall F2. This means that the invocation must pass out through the object gateway G1 in the first firewall F1 and in through the object gateway G2 in the other firewall F2. If there is an object reference in the invocation, e.g. a reference to yS, this must be transformed so that it can be used in the destination environment. Similarly, a reference passed in a response, e.g. a reference to xS, must be transformed to be usable in its destination environment.

The standard CORBA location transparency mechanisms, which allow servers to be restarted on different hosts, and to listen on different ports, must also work properly across the firewalls.

The object gateway(s) described herein provides the reference transformation and connection establishment required for transparent access across the firewalls, F1 and F2. It also incorporates a mechanism to control or revoke access to servers, even where the references were passed as parameters.

The object gateway is designed to be deployed on a host with multiple network interfaces running a Trusted Operating System (e.g. VVOS) supporting Multi-Level Security. The gateway is designed for a configuration where the sensitivity labels are set up to prevent unprivileged processes from having access to more that one network. The object gateway may also be deployed on conventional hosts; typically, this would be on a bastion host that is part of a firewall.

The object gateway components are described in terms of an implementation on HP ORB Plus. A description at this level is necessary in order to understand how the components and interactions that are not normally visible to an application programmer work across the gateway.

The object gateway design exploits the interoperability facilities that are in the CORBA specification [OMG 95]. In particular, it uses the features of IORS, and the Internet Inter-ORB Protocol (IIOP). IORs and IIOP will now be described briefly.

IORs are defined in the CORBA Specification using the following IDL:

```
module IOP{//IDL
    //
    //Standard Protocol Profile tag values
    //
    typedef unsigned long ProfileId;
    const ProfileId TAG_INTERNET_IOP=0;
    const                              ProfileId
        TAG_MULTIPLE_COMPONENTS=1;
    struct TaggedProfile {
        ProfileId tag;
        sequence <octet> profile_data;
    };
    //
    // an Interoperable Object Reference is a sequence of
    // object-specific protocol profiles, plus a type ID.
```

```
//
  struct IOR {
    string type_id;
    sequence <TaggedProfile> profiles;
  };
//Remainder of module deleted.
};
```

For the description of the generic gateway components, the important feature is the sequence of tagged profiles. The type_id will be used later when describing how to specialise some of the components.

Each tagged profile consists of a profile identifier (e.g. "TAG_INTERNET_IOP") and the profile data. In the simplest IOR, for a service supporting the IIOP protocol, the profile sequence only has a single TaggedProfile data item having the tag "TAG_INTERNET_IOP". This indicates that the sequence contained in the profile_data field is a ProfileBody, as defined in the IIOP module. Below is shown the IIOP version 1.0 definition from [OMG 95].

```
  module IIOP {//IDL
    struct Version {
      char major,
      char minor,
    };
    struct ProfileBody {
      Version iiop_version;
      string host;
      unsigned short port;
      sequence <octet> object_key;
    };
  };
```

The ProfileBody consists of the IIOP version number, host name or IP address, TCP/IP port and an opaque sequence of octet (bytes) known as an object key. The host address and port specify where the server is to connect, and the object key is opaque and is sent over the connections as part of an IIOP request by the client. The server process uses this to identify the object when it receives an invocation. Since the client is not allowed to interpret the object key, (it is just an opaque string of bits) the present embodiment uses this to store the object reference of the target service accessible through the gateway.

In the present description of the gateway, the host, port and object key are the significant data in an IOR profile. Hereafter, IORs will be shown as IOR[h:p:k] for an IOR with a single profile, so that the relevant items can be picked out in the descriptions. An IOR with two profiles will be written IOR[h1:p1:k1,h2:p2:k2].

For simplicity, the following description will be in terms of only some of the features of IIOP, but it will be appreciated that the relevant components are built using full-function ORBs supporting the whole protocol. IIOP is the General Inter-ORB Protocol (GIOP) transmitted over TCP/IP; the messages transmitted are GIOP messages.

A GIOP request message, or invocation, is used to invoke an operation on some object, or service; the response is a reply message. These are the only message types that will be discussed herein. The relevant part of GIOP, specified in IDL and taken from [OMG 95] is shown below:

```
  module GIOP {//IDL
    enum MsgType {
      Request, Reply, CancelRequest,
      LocateRequest, LocateReply,
      CloseConnection, MessageError
    };
    struct MessageHeader {
      char magic [4];
      Version GIOP_version;
      boolean byte_order,
      octet message_type;
      unsigned long message_size;
    };
    struct RequestHeader {
      IOP::ServiceContextList service_context;
      unsigned long request_id;
      boolean response_expected;
      sequence <octet> object_key;
      string operation;
      Principal requesting_principal;
    };
    enum ReplyStatusType {
      NO_EXCEPTION,
      USER_EXCEPTION,
      SYSTEM_EXCEPTION,
      LOCATION_FORWARD
    };
    struct ReplyHeader {
      IOP::ServiceContextList service_context;
      unsigned long request_id;
      ReplyStatusType reply_status;
    };
//Remainder of module deleted.
}
```

GIOP 1.1 [OMG 97B] adds support for fragmentation. This does not introduce any new issues for the gateway. Although it is necessary to understand which messages are sent where, the gateway does not deal with the messages directly. The gateway interacts with the ORB at the language mapping level.

A request message consists of a GIOP message header, a Request Header, and a Request Body. The Request Body contains the 'in' and 'inout' arguments. The significant elements of the request are the object key, the operation name, and the arguments. In the description below, request messages will be shown as k:op:args to allow these elements to be discussed.

A reply message consists of a GIOP message header, a Reply Header and a Reply Body. The content of the Reply Body depends on the status in the header. Replies with status LOCATION_FORWARD have an IOR as the body, and these are considered explicitly in the description. Replies with status NO_EXCEPTION have the return value, inout and out parameters as the body. Other replies have the exception as the body. These cases are shown as status: results in the description as the difference is not significant for the behaviour of the gateway.

Although the description below explicitly considers replies with status LOCATION_FORWARD, the client ORB is responsible for processing the reply and sending the request to the new destination. The important issues for the gateway design are identifying where the ORB needs to be modified, and arranging the use of IORs to confine such changes to the ORB supporting gateway components. It is important that the ORBs supporting the ultimate clients and servers do not need to be modified.

The overall structure of the gateway as described herein is determined by the decision to run it on a trusted operating system that supports Mandatory Access Control and Multi-Level Security, and which supports privileges that allow fine-grained control over sensitive system facilities. In particular, the gateway is designed to run on the HP VirtualVault configuration.

Figure 17:
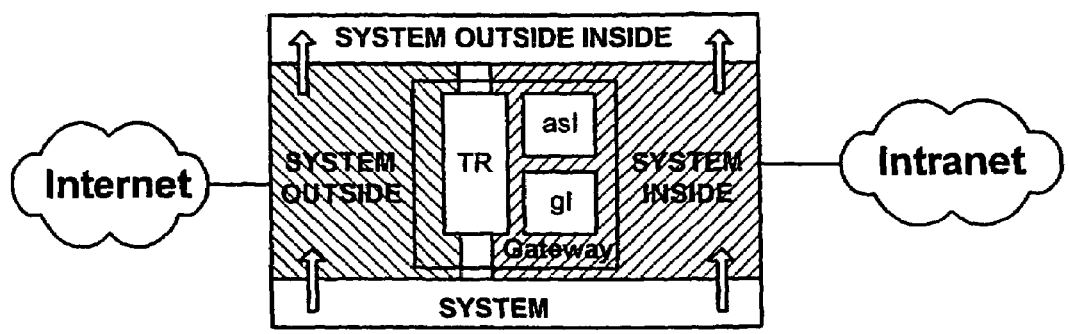
FIG. 17 is a diagram which illustrates an implementation of the gateway on a secure operating system.

The overall structure of the gateway is shown in FIG. 17.

On VirtualVault, every resource (data or process) is labelled with one of the four sensitivity labels (SYSTEM OUTSIDE INSIDE (SOI), SYSTEM OUTSIDE (SO), SYSTEM INSIDE (SI) and SYSTEM (S)) shown in the diagram in FIG. 17, and the system enforces Mandatory Access Control rules based on these labels.

Sensitivity labels are associated with every process and file system object, and are used as the primary basis for all MAC policy decisions. A sensitivity label represents the sensitivity of a process or a file system object and also the data each contains. If an application and the file it attempts to access have compatible sensitivity labels, the application can read, write, or possibly execute the file, and each new process typically inherits the sensitivity label of its parenL For example, if a program is executed within a shell (for example, sh(1), csh(1), or ksh(1)), the new process automatically inherits the sensitivity label of the shell process. New files always inherit the sensitivity label of the process that creates them. The system can provide special trusted programs that may be employed for changing the sensitivity label of a file after it has been created.

Sensitivity labels are also prioritised for MAC in a way that determines how processes or objects having one sensitivity label can interact with processes or objects having different sensitivity labels. The prioritisation is defined internally of the operating system and is in the form of a 'dominates' relationship, in which certain sensitivity labels dominate, or are dominated by, others. Thus, according to the arrows in FIG. 17, SO and SI dominate S, and SOI dominates SO and SI. One further important aspect of the dominates relationships is that each sensitivity label dominates itself.

Users are generally not permitted to downgrade (by reducing the respective sensitivity labels of) any files, processes or objects which they control, so that the new label is dominated by the previous label. Also, users are not permitted to cross grade them so that the new label is incomparable to the previous one. The system is also configured so that downgrading and cross grading are not enacted automatically by the acts of reading or writing.

The effect of the MAC policy is to rigidly control information flow in the system, from process to file to process, to prevent accidental or intentional mislabelling of sensitive information. To achieve this, for every operation, the system compares sensitivity labels to determine if a user or process can access an object. Any time a user or process tries to read, write, or execute a file, the system examines the process and object sensitivity labels and consults its MAC rules. For each operation a process requests the system determines if the process has mandatory read or mandatory write access to the object. Most restrictions that the MAC policy enforces can be summarised by the two following rules:

(1) Mandatory read access: a process can read or execute a file, search a directory, or (subject to other privilege requirements) read the contents of other objects if the process's sensitivity label dominates the object's. All of these operations involve transferring data from the object to the process, so having such access is referred to as "mandatory read" access.

(2) Mandatory write access: a process can write to a file, remove or create an entry in a directory, or change any object's security attributes (including its sensitivity label), if the process's sensitivity label is the same as the object's. All of these actions involve transferring data from the process to the object, so having such access is called "mandatory write" access.

The first rule prevents a user or process that is not cleared for classified information from seeing it. The second rule prevents a user with a high clearance from revealing information to other users with lower clearances.

In effect, MAC ensures that information can flow only in the opposite direction to the "dominates" relationship.

Systems such as VirtualVault do not impose the concept of an all-powerful "Super User" (e.g. "root") or Administrator. Instead, this power is divided up into a number of privileges. Assigning privileges to a program confers on it power to do particular actions. Programs with these privileges are known as 'trusted processes'. Trusted processes, such as TR, have the privileges that allow them to override the MAC. Thus, the gateway must use the TR to pass information between the inside and outside networks.

Trusted processes are typically very small programs, which are carefully designed to carry out a single, specific process, such as passing specific data between compartments. Trusted processes have privileges which enable them to override MAC, but these privileges are only raised when required, and lowered thereafter, to minimise the chances of misuse by any other user or process. Also, a trusted process checks whether a user or other process has the right to access it, before allowing such access. In this way, a correctly configured secure operating system can provide a tightly controlled barrier between the outside network (Internet) and the inside network (Intranet).

A more detailed description of a system enforcing MAC is included in the Applicant's co-pending European Patent Application 97309328.9 filed on 19 Nov. 1997.

The object gateway is structured into interceptors (also referred to herein as "interface means" or "proxies") that do most of the work; these are shown in the diagram as 'gI'—a generic interceptor—and 'asI'—an application specific interceptor. These are relatively large and complex processes, and so it is not appropriate to give them privileges to override MAC. The objective is to enable invocations from the outside (Internet) to reach inside services via the interceptors. The TR has the privileges required to override MAC. It is the job of the TR to ensure that all incoming invocations go to an interceptor. The interceptor then performs the access control functions that defend the inside objects from rogue invocations.

Although the gateway can be implemented on a conventional operating system (with reduced security assurance), the description that follows includes the TR since this introduces some issues in the construction of IORS. It should be noted that when running under a conventional operating system, either a simplified form of a trusted relay may be used, or the functions performed by a trusted relay for the interceptors may be incorporated into the interceptors themselves.

In the description that follows, a CORBA client xC outside the firewall will invoke a server xS inside firewall, behind the object gateway behind in the sense that the server is on the side from which the gateway is controlled).

Figure 18:
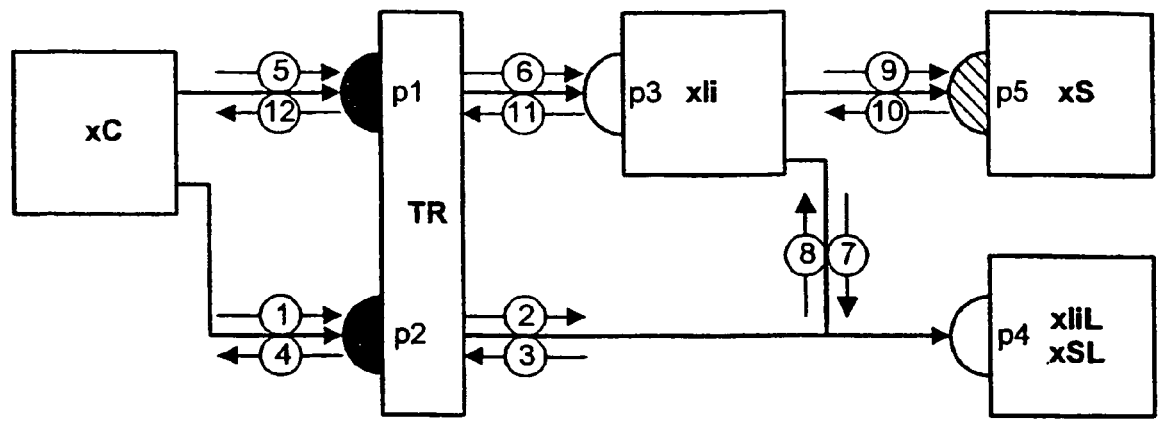
FIG. 18 is a diagram which illustrates how the system of FIG. 17 manages an inbound object invocation.

FIG. 18 shows the components involved in an incoming invocation from a client xC.

The components may be running on separate hosts or on the same host. In the following description, a host will be identified by the component name prefixed with 'h' (e.g. hxS is the host on which xS runs).

The sequence of events for an inbound invocation starts with xC holding the object reference ref=IOR[hTR:p2:kxI] and making the invocation ref→op(args). Initially, none of the connections is in place; for subsequent invocations, existing connections may be re-used.

1 xC connects to hTR:p2 and sends request kxI:op:args

2 TR connects to hxIiL:p4 and sends request kxI:op: args—TR needs to know to connect to hxIiL.p4 for connections accepted on p2

3 xIiL replies with LOCATION_FORWARD to IOR [hTR:p1:kxI]—xIiL needs to know kxI→IOR[hTR:p1: kxI], this is the standard information that the object locator knows, except that the port is p1 rather than p3. xIi must have created this IOR and registered it with xIiL.

4 TR replies with LOCATION_FORWARD to IOR[hTR: p1:kxI]

5 xC connects to hTR:p1 and sends request kxI:op:args

6 TR connects to hxIi:p3 and sends request kxI:op: args—TR needs to know to connect to hxIi:p3 for connections opened on p1, xIi will have instructed TR to do this as described in more detail below.

7 xIi connects to hxSL:p4 and sends request kxS:op: mapoi(args)—xIi knows kx→IOR[hxSL:p4:kxS] because kxI=Kio(IOR[hxSL:p4:kxS]) where Kio is a function that wraps an IOR and some other information into an object key, and xIi has functions to verify kxI and extract the IOR. mapoi is a function that replaces IORs in their outside form with IORs that will work on the inside. These functions are described in more detail below 8 xSL replies with LOCATION_FORWARD to IOR [hxS:p5:kxS]—xSL needs to know kxS→IOR[hxS:p5: kxS], this in the standard object locator information.

9 xIi connects to hxS:p5 and sends request kxS:op:mapoi (args)

10 xS performs service and replies status:results (if status signifies an exception, results is the marshalled exception)

11 xIi replies status:mapio(results), mapio is a function that replaces IORs in their inside form with IORs that will work on the outside 12 TR replies status:mapio(results)

Alternatively, if the object reference held by xC is IOR [hTR:p1:kxI,hTR:p2:kxI], and xC tries the profiles in order, the process starts at step 5. If xIi is running and TR is relaying p1 to p3, the invocation proceeds as shown. If the relay can be made to re-use the same port number for a service if it is available, connections can be made slightly more quickly. If the port is not available, the relay can use any port, but in this case, the chosen port number must be passed back into the relocation mechanisms.

There may be a packet filter or other firewall component restricting the ports that can be used to connect to TR from the outside. In this case, TR must choose a port for p1 from the set of ports that the external component allows. Either TR or xIi may be configured to know which ports to use. If xIi rather than TR has the information, then a protocol will be required to deal with the case where the suggested port is already in use, and a new suggestion is required.

If TR can be guaranteed to obtain all of the ports allocated for use from outside, and the mapping of external ports to interceptors is static for the lifetime of persistent object references to those interceptors, the object locator and its relocation mechanisms are not required.

At step 3, xIiL may start xIi if it is not already running. The mechanism for doing this is described below.

At step 7, if the IOR embedded in kxI was IOR[hxS:p5: kxS,hxSL:p4:kxS] and xIi tries the profiles in order, the process continues from step 9 rather than step 7.

Some properties of the configuration are that the only directly accessible ports are those on which TR is listening: p1 and p2. Also, indirectly accessible from the outside are the ports to which TR connects: p3 and p4. TR must be running on host hTR and listening on port p2, which are in the external form IORs in order to receive the object locator requests. Further, the interceptor xIi listens for requests on port p3. Incoming connections on port p1 are relayed to p3, therefore the external form of reference can contain a profile referring to p1 (rather than p3), as well as containing a profile referring to p2 (rather than p4).

For persistent outside references to work, port p2 must be fixed (e.g. the object locator port). The locator mechanisms fix up other ports, but re-using old ports will have a slight efficiency advantage.

Figure 19:
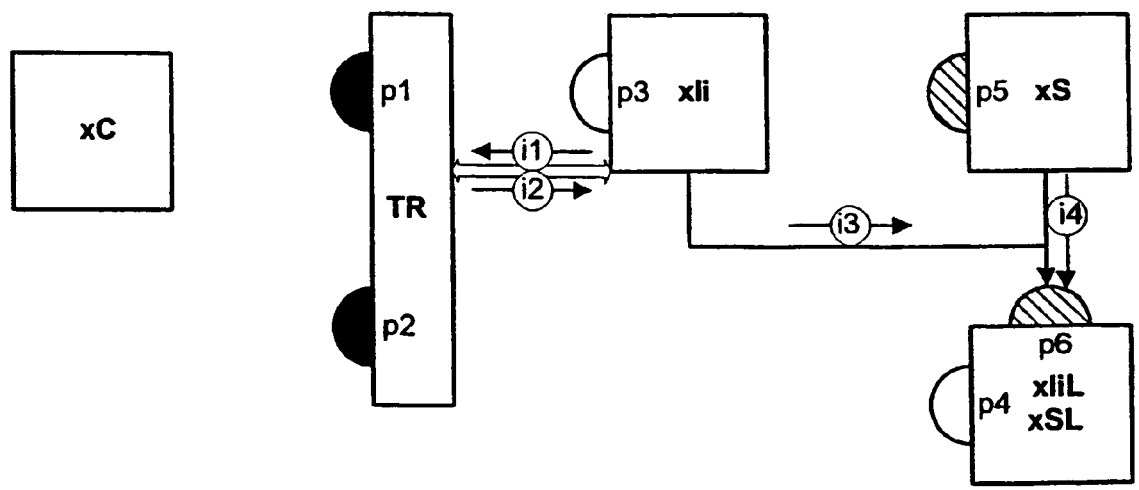
FIG. 19 is a diagram which illustrates how the system of FIG. 17 is initialised.

The invocation described above assumes that various mappings are in place, and IORs contain particular information. Some initialisation steps establish this position, as illustrated in FIG. 19.

i1 xIi instructs TR to establish a relay from p1 to p3 i2 TR responds with actual value of p1 used i3 The IOR for xIi is registered with xIiL, but with p1 rather than p3 as the port.

i4 The IOR for xS is registered with xSL, this is a normal registration.

Steps 3 and 4 have responses, but these are not shown in the diagram since there is no significant new data in them.

Steps 1, 2 and 3 must occur in order, but step i4 is independent of the others. Step 4 could occur before the others or at any time before step 8 in FIG. 18 (the locator responding with the location of xS). In particular, xS may be started in response to the request from xIi for that service (step 7 in FIG. 18).

The instructions to TR from xIi, and responses to those instructions, are sent via pipes. The idea is to ensure that unauthorised programs cannot instruct TR to open connections. In order to establish the pipe connections, xIi is started by TR. It is important that TR knows that xIi has not been modified. xIi is relatively more sensitive than other components since it can instruct TR to establish incoming connection relays.

Note that xIiL is shown as listening on two ports. This is because one, p4, is exposed via TR for invocation attempts to be remapped, and administrative operations should not be exposed through that port. All administrative requests should arrive via p6, and this is the port that should appear in the IOR for the object locator (which can be found in /etc/opt/orbplus).

Interceptors such as xIi construct the IORs that are passed out to external clients. When creating the external reference for xS, xIi must use p2 as the locator port, and should use p1 as the hint port.

xIiL needs to know p4, the port on which it is to listen. Conventionally, the object locator listens on a fixed port, but if xIiL is used only via TR, p4 need not be fixed, but in this case, the port used must be made known to TR and xIiL. Static configuration is the simpler option.

xIiL does not need to know p2, provided that xIi rather than xIiL creates the external form IORs, or can substitute port numbers in the relevant places.

xIi needs to know p2 as locator port for inclusion/substitution in IORs.

xIi needs to know p1 as substitute for its own p3 both for use in the IOR passed to xIiL for relocation, and for inclusion in another profile in external form IORs if the short-circuit mechanism is required.

TR needs to know the p1–p3 mapping—accept a preferred p1 value from xIi, but it must be able to report the actual value used back to xIi.

TR needs to know the p2–p4 mapping, this may be statically configured.

There will now be described some possible attack strategies, and the feature of the configuration that defeats them will be identified.

If xIiL is also the object locator for inside services:
  xIiL knows the kxS→IOR:[hxS:p5:kxS] mapping.
  A connection to hTR:p2 and request message kxS:op:args will respond with LOCATION_FORWARD to IOR [hxS:p5:kxS] through the TR connection to xIiL.
  An attempt to connect to hxS:p5 from outside will fail.
  A connection to hTR:p1 with request message kxS:op: args will be forwarded to hxIi:p3 and then fail. It fails because xIi rejects requests with unknown object keys.
  The attacker learns that kxS is at least partially valid as an object key. If the attacker understands ORB Plus IORS, it can discover that the virtual server name in the object key is valid.

If the attacker invokes an administration operation (e.g. register_sp, set_command) on the object locator through port p2:
  xIiL must use separate ports for administration (p6) and for redirecting invocations (p4). Invocations sent to p2 are forwarded to p4. If xIiL keeps these functions separate, and does not establish a relay to p6, the request will be rejected. N.B. this requires a modified object locator.

The CORBA Dynamic Skeleton Interface (DSI) and Dynamic Invocation Interface (DII) makes it possible to implement a generic interceptor that can handle interfaces with any arbitrary IDL. This is in contrast to type-specific interceptors that include stub and skeleton code generated by an IDL compiler, and specific implementations of the operations defined in the interface.

Clients may also use DII to invoke a service. In particular, the client of an inbound invocation may be a generic interceptor in an outbound invocation through another firewall as described in more detail below.

Figure 20:
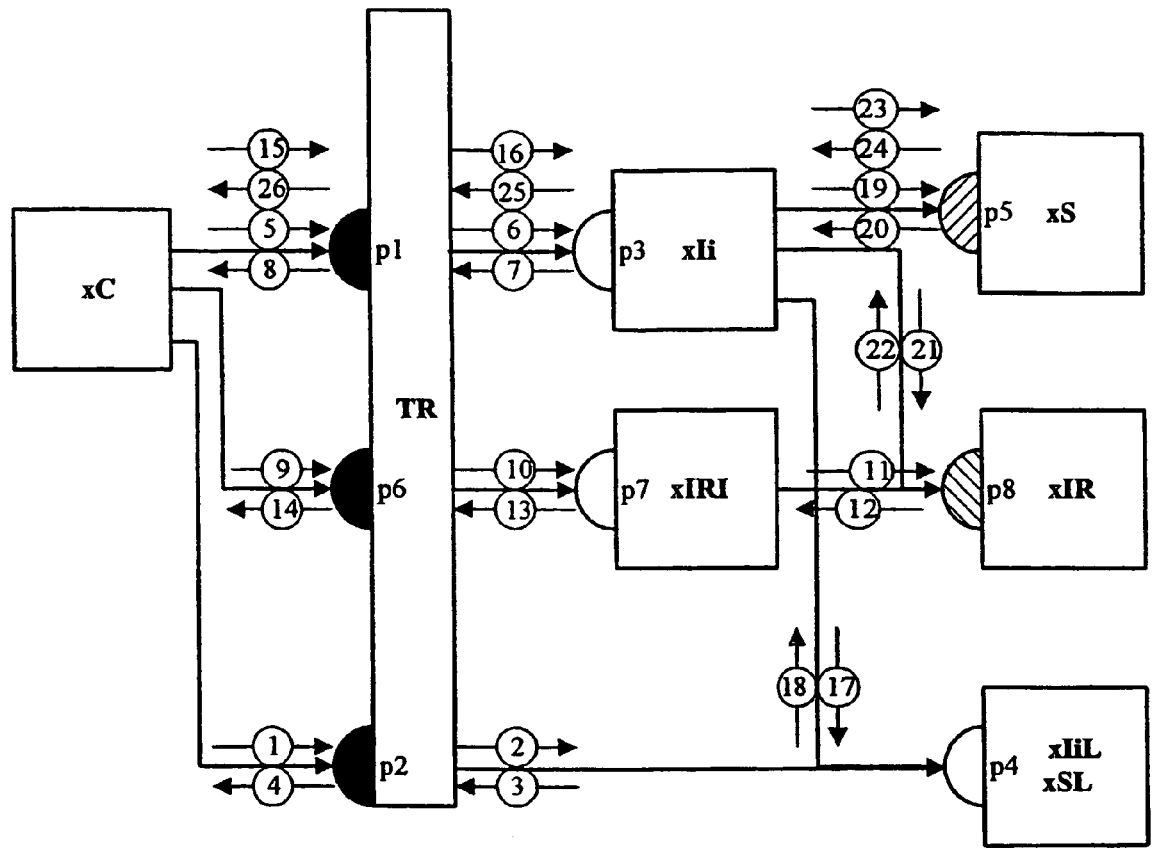
FIG. 20 is a diagram which illustrates how the system of FIG. 17 manages inbound object invocations requiring dynamic proxy generation.

In order to support DII, a get_interface operation can be invoked on any interface. This operation returns a reference to an InterfaceDef—an interface supported by a standard service called the Interface Repository. The client can then invoke operations on the returned InterfaceDef to explore the type while constructing a request with the correct parameter types for the operation. FIG. 20 shows what happens when a client using DII invokes a service through a Generic Interceptor that also uses DII.

FIG. 20 shows the components involved in an incoming invocation from a client that uses DII. In addition to the components in FIG. 18 there are:
  xIRI: the interceptor for InterfaceDef services in xIR
  xIR: the Interface Repository which holds the definition of the 'x' interface The sequence of events for an inbound invocation from a client xC using DII starts with xC holding the object reference ref=IOR[hTR:p2:kxI] and enquiring about the interface so that it can construct a request. xC does this by making the invocation ref→get_interface( ).

1 xC connects to hTR:p2 and sends request kxI: get_interface: since it is using DII and needs information about the interface in order to construct a request.
2 TR connects to hxIiL:p4 and sends request kxI: get_interface:—TR needs to know to connect to hxIiL: p4 for connections accepted on p2 as before
3 xIiL replies with LOCATION_FORWARD to IOR [hTR:p1:kxI]—xIiL needs to know kxI→IOR[hTR:p1: kxI] as before
4 TR replies with LOCATION_FORWARD to IOR[hTR: p1:kxI]—these first four steps are equivalent to the first four steps of the inbound invocation described above. The operation is different, but this has not yet been used.
5 xC connects to hTR:p1 and sends request kxI: get_interface:
6 TR connects to hxIi:p3 and sends request kxI: get_interface:—TR needs to know to connect to hxIi: p3 for connections opened on p1 as before
7 xIi replies with NO_EXCEPTION:mapio(xDef)—xDef is a reference to an object in xIR that describes interface 'x', mapio translates this to the externally usable form of a reference to an interceptor in xIRI. Let xDef be IOR[hxIR:p8:kxD], then mapio(xDef) is IOR [hTR:p6:Kio(IOR[hxIR:p8:kxD])] where Kio is a function that wraps the destination IOR and some other information into an object key.
8 TR replies with NO_EXCEPTION:IOR[hTR:p6:Kio (IOR[hxIR:p8:kxD])]
9 xC connects to hIR:p6 and sends request Kio(IOR [hxIR:p8:kxD]):ir_op:ir_args invoking some interface repository operation
10 TR connects to hxIRI:p7 and sends request Kio(IOR [hxIR:p8:kxD]):ir_op:ir_args—TR needs to know to connect to hxIRI:p7 for connections opened on p6
11 xIRI connects to hxIR:p8 and sends request kxD: ir_op:mapoi(ir_args)—note that the arguments to the interface repository operation originate on the outside, and so mapoi is used to convert any object references in the arguments to forms that will work on the inside.
12 xIR replies status:results as appropriate to the operation
13 xIRI replies status:mapio(results)—the results will be sent outside so inside to outside mapping function mapio is used.
14 TR replies status:mapio(results); steps from 9 are repeated until xC has enough information about the interface, operation, and parameters
15 xC uses connection established at step 5 to hTR:p1 and sends request kxI:op:args—apart from the connection already existing, this is step 5 from the previous inbound invocation.
16 TR uses connection established at step 6 to hxIi.p3 and sends request kxI:op:args.
17 xIi connects to hxSL:p4 and sends request kxS: get_interface:—xIi is a generic interceptor that uses DII. Like the client at step 1, it needs to obtain information about the interface in order to construct a request. A generic interceptor also needs this information in order to understand the arguments in the incoming request. xIi knows kxI→IOR[hxSL:p4:kxS] because kxI=Kio(IOR[hxSL:p4:kxS]) where Kio is a function that wraps an IOR and some other information into an object key, and xIi has functions to verify kxI and extract the IOR.
18 xSL replies with LOCATION_FORWARD to IOR [hxS:p5:kxS]—xSL needs to know kxS→IOR[hS.p5: kxS]
19 xIi connects to hxS:p5 and sends request kxS: get_interface:—this is the retry of step 17 with the target defined by the IOR received in step 18.
20 xS replies with NO_EXCEPTION:xDef where xDef is IOR[hxIR:p8:kxD] as in step 7

21 xIi connects to hxIR:p8 and sends request kxD:ir_op: ir_args—unlike step 11, the arguments originate on the inside at xIi, so no mapping function is used.

22 xIR replies status:results as appropriate to the operation—steps from 21 are repeated until xIi has enough information about the interface, operation, and parameters 23 xIi uses connection established at step 19 to bxS:p5 and sends request kxS:op:mapoi(args)—these are the operation and arguments sent from the client at step 15. Since the arguments originate on the outside, the outside to inside mapping function mapoi is used.

24 xS performs service and replies status:results 25 xIi replies status:mapio(results)—the results will be sent outside so inside to outside mapping function mapio is used.

26 TR replies status:mapio(results)

It should be noted that xIRI does not support all of the interface repository interfaces. It supports only the InterfaceDef interface, and restricts callers to the describe_interface operation.

As for the previous incoming invocation example, the round trips to the object locator can be avoided if IORs have appropriate additional profiles.

At step 7, xIi responds to the get_interface operation. A normal server would find its own Interface Repository, and invoke it to look up the appropriate InterfaceDef. The server xS does this at steps 19–20. If xIi uses its own interface repository then xIi and xS must be using the same interface repository, or at least interface repositories that contain the same definitions. This standard response to get_interface is provided by the ORB, and no application intervention is required.

Propagating invocations across multiple firewalls requires that all the interceptors are able to respond correctly to get_interface. It is not practical to require that interface repositories be synchronised across multiple independent organisations. Each interceptor must intercept the get_interface operation in the same way as other operations and invoke get_interface on its target interface. Ultimately, the server uses the standard process to obtain an interface to its own interface repository.

The interceptors, such as xIi, also need the information provided by the get_interface operation (steps 17–22 above). If xIi captures the results of the invocations from xC, xIi need not invoke the interface repository later—i.e. steps 17–22 above will not be needed. xIi will also be able to respond immediately using the saved information to a subsequent get_interface from xC or any other client.

The ORB Plus object locator can start server processes dynamically. It does this by invoking a command that has been registered for a server process. This can be used to avoid having rarely used servers running all the time—server processes can time-out and shut down, then restart on demand. This can also avoid the need to include servers in system restart configurations. Servers registered with the object locator can be left to start when they are first called.

The Applicants have determined that this technique can also be applied to interceptor processes. Starting a new type of interceptor server while the gateway is running presents the same issues as starting interceptors from the object locator.

There are two possible strategies for starting interceptors dynamically:

1 Have the object locator start the interceptor and provide a trustworthy way for a valid interceptor to pass instructions to the trusted relay.

2 Have the object locator start a program that instructs the trusted relay to launch an interceptor.

Both of these strategies require that a program is able to establish communication with the trusted relay.

In the first strategy, the trusted relay has no way to verify the instructions. It must have sufficient confidence that any program able to establish communication is also authorised to issue instructions to establish a connection relay. The mechanism that allows the program to establish communication should be disabled if the executable file is modified. If it is possible to arrange that interceptors have a privilege that allows them to connect to the trusted relay's command input, this would achieve the objective.

In the second strategy, the trusted relay can consult a configuration file, or some other resource, to obtain the parameters it needs to ensure that the interceptor is acceptable, and unmodified. Once the check has been passed; the trusted relay can start the interceptor with a pipe connection for transmitting connection relay requests.

There now follows a description of the features of the object gateway that support clients behind a firewall. In particular, the description covers how outgoing invocations are processed, and how services visible outside the firewall can be made visible inside the firewall.

In the following example, some CORBA server yS outside the firewall will be invoked by a client yC that is inside the firewall, behind the object gateway (behind in the sense that the client is on the side from which the gateway is controlled).

Figure 21:
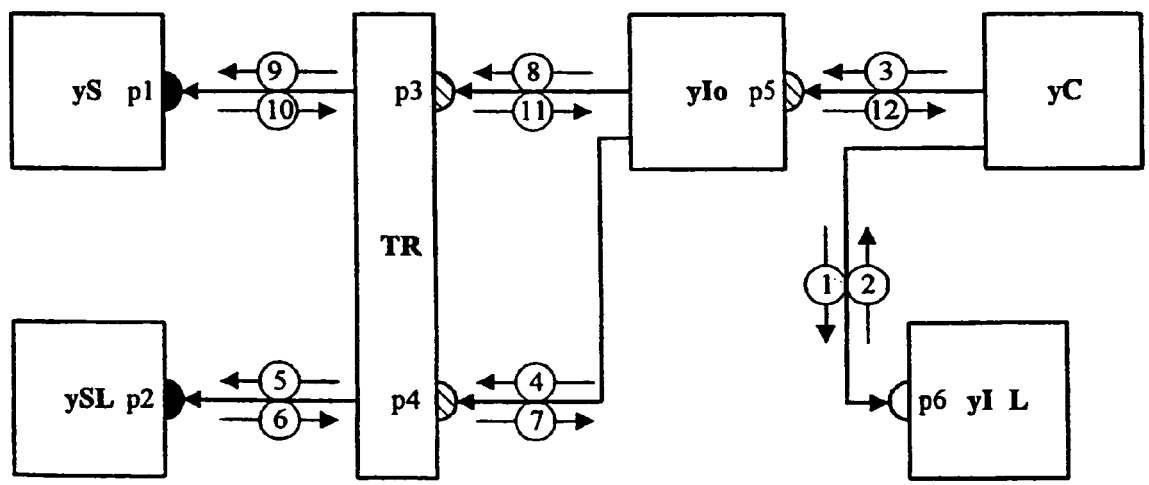
FIG. 21 is a diagram which illustrates how the system of FIG. 17 manages outbound object invocations.

The diagram in FIG. 21 shows the components involved when client yC invokes server yS, and includes the components:

yC: the client for service 'y'
yIo: the interceptor for outbound invocations of service 'y'
yIoL: the object locator for 'yIo'
TR: the Trusted Relay
yS: the server for service 'y'
ySL: the object locator for yS The components may be running on separate hosts. The host are identified by the component name prefixed with 'h' (e.g. hyC is the host on which yC runs).

The sequence of events for an outbound invocation starts with yC holding the object reference ref=IOR[hyIoL:p6:kyI] and making the invocation ref→op(args). Initially, none of the connections is in place; for subsequent invocations, existing connections may be re-used.

1 yC connects to hyIoL:p6 and sends request kyI:op:args 2 yIoL replies with LOCATION_FORWARD to IOR [hyIo:p5:kyI]—yIoL needs to know kyI→IOR[hyIo: p5:kyI], this is standard CORBA relocation 3 yC connects to hyIo:p5 and sends request kyI:op:args 4 yIo connects to hTR:p4 and sends request kyS:op:mapoi (args)—yIo knows kyI→IOR[hySL:p2:kyS] because kyI=Koi(IOR[hySL:p2:kyS]) where Koi is a function that wraps an IOR and some other information into an object key, and yIo has functions to verify kyI and extract the IOR. (Note that Koi wraps an outside IOR into a key for use inside, whereas Kio which was introduced earlier wraps an inside IOR into an object key for use outside. These functions are described in more detail under "Mapping Object References".) yIo also needs to know hySL:p2→hTR:p4 (perhaps creating the mapping)

5 TR connects to hySL:p2 and sends request kyS:op: mapio(args)—TR needs to know to connect to hySL:p2 for connections accepted on p4

6 ySL replies with LOCATION_FORWARD to IOR [hyS:p1:kyS]—ySL needs to know kyS→IOR[hyS:p1: kyS], this is standard CORBA relocation 7 TR replies with LOCATION_FORWARD to IOR[hyS: p1:kyS]

8 yIo connects to hTR:p3 and sends request kyS:op:mapio (args)—yIo needs to know hyS:p1→hTRp3 (perhaps creating the mapping)

9 TR connects to hyS:p1 and sends request kyS:op:mapio (args)

10 yS performs service and replies status:results

11 TR replies status:results 12 yI replies status:mapoi(results)

Alternatively, if the object reference held by yC is IOR [hyI:p5:kyI,hyIL:p6:kyI], and the profiles are processed in order, the invocation will start at step 3.

At step 4, if yI knows kyI→IOR[hyS:p1:kyS,hySL:p2: kyS], and processes the profiles in order, it proceeds from step 8 instead of step 4.

At steps 4 and 5 and again at steps 8 and 9, the interceptor needs to connect to the relay rather than the host and port specified in the IOR, and the relay needs to make the onward connections. The interceptor is passing instructions to the relay, and the relay must have a way to know that the instructions are trustworthy.

There are two possible approaches to establishing outbound connections through the relay:

1 A SOCKS-like approach [SOCKS] where a connection is made to some nominated port, and the destination host and port are sent as an in-band prefix to the main communication; or 2 An out of band control channel is used to set up the outbound connection relay.

In either case, the trusted relay needs to know that the instructions are from a source authorised to specify outbound connection relays. Outbound connections may be considered less sensitive than inbound connections, but in the present example "inside" applications cannot connect to the outside network. A relay that accepts instructions from any inside process removes this feature.

The trusted relay can obtain the required assurance either by inspecting the instructions, or by knowing that they were delivered over a trustworthy connection. The trusted relay could validate the instructions by checking a digital signature, but this would introduce signature checking and the related certification issues into TR. So, it is better to use a connection that is trustworthy in the sense that it cannot be intercepted, and is known to originate at an authorised component.

If the destination instructions are specified over a trustworthy connection, the SOCKS-like approach requires that all outbound traffic go via the trustworthy connection.

With the out-of-band approach, the trusted relay is instructed to establish a relay to some specified host and port, and replies with the port number on which it is listening for the connection from the interceptor. If the interceptor for outbound invocations is combined with the interceptor for inbound invocations then the same relay control channel can be used for establishing inbound and outbound connection relays. One disadvantage of using an out of band control system is that the connection relay exists independently of a particular connection, and a garbage collection strategy will be required to prevent a build-up of dormant relays.

For a client to invoke an external service, it must obtain a reference to an interceptor for the external service. The IOR mapping functions construct additional references once a first reference has been obtained. Given an internal form reference to an external naming context, resolving names in that context provides internal form references to the services. The requirement is for an interface to the outside-to-inside mapping function of the generic interceptor, and an external form reference to the required external context. An internal reference to the external context can then be created and bound to some suitable name in an internal naming context for use by clients.

The reference to the external context, and references derived from the use of this service, may need to be revoked. This may include internal services that have been made available externally as parameters to outbound calls. If clients are given the use of an interceptor to the root of the external hierarchy then the revocation is all or nothing. By creating an internal 'shadow' of the external naming structure, a finer grained revocation mechanism can be used, as will be described in more detail bel w.

Figure 22:
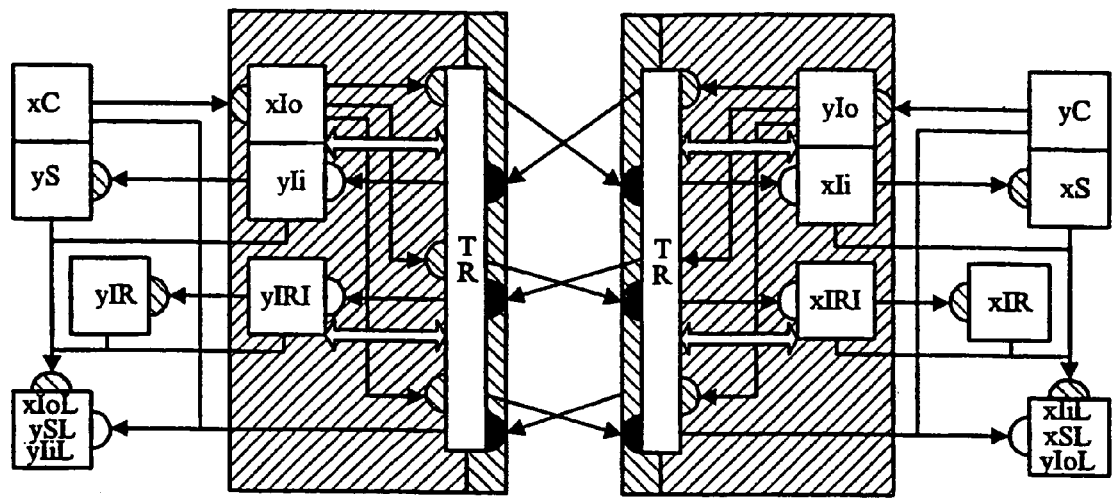
FIG. 22 is a diagram which illustrates a full system implementation of both client and server side gateways implemented on secure operating systems.

In the general case, there will be both clients and servers behind each firewall, and there will be firewalls at both ends in each interaction. This leads to the combined configuration shown in FIG. 22. The components are designed to be deployed on a trusted operating system, with MAC being used to prevent unprivileged processes from having access to both networks. FIG. 22 also shows the components that must run on the trusted hosts on a shaded background. The configuration shown here uses a simple inside/outside split as is used in VirtualVault.

The TR is the only component that requires privileges. Alternatively, as discussed above, it may be appropriate to grant some privilege to interceptors. None of the other components need to run on the trusted OS, nor does any need any special ORB features. The end clients and servers, the Interface Repository and the Implementation Repository (object locator) are standard components or application components built on standard ORBs.

The descriptions above have used the functions mapio, mapoi, Kio and Koi to show where object reference mapping occurs.

mapio and mapoi are used on arguments and results of invocations (including exceptions). They both work by traversing the structure and replacing object references with the appropriate mapped form. The important part of each function is the mapping it applies to an object reference.

For an internal reference IOR[hi:pi:ki], mapio (IOR[hi:pi:ki])=IOR[hTR:pTR:Kio(IOR[hi:pi: ki])]

where a relay has been, or will be, established from hTR: pTR to hIiL:pIiL, the host and port for the object locator for an interceptor that handles incoming invocations of this interface.

Kio(IOR[hi:pi:ki])=<tag,"i",IOR[hi:pi:ki],h(<tag,"i",IOR [hi:pi:ki],S>)>

The result of Kio consists of a tag which allows access to be revoked, a constant "i" that signifies that this the embedded IOR is native to the inside of the gateway that generated this reference, the IOR, and a secure hash of these elements and a secret S.

By default, interceptors are instantiated containing the tag that they embed in the keys generated by their Kio function. Specialised interceptors have the option of inventing new tags to embed in references that they pass out. The naming interceptor for the bootstrap context uses this to assign different tags to the top level services.

The secret S is used to verify that the key has not been forged. The interceptor that generates the object key, and any interceptor that unwraps the key must share the secret. All interceptors in the gateway need to know the secret, but it need not, and should not, be known outside of the gateway. Alternatively, there could be a different secret for each tag, although the advantages and disadvantages of this approach are not known.

The secret must be stored securely, since knowing this secret makes it possible to construct an IOR that will be accepted by the gateway. When the gateway is deployed on a system with MAC and Multi-Level Security, the key can be stored with a sensitivity label designated for key storage, and for which gateway processes and other applications are not cleared. The trusted relay can be cleared to access the keys, and it can also provide a signing function for the interceptors that are connected to it. The existing trustworthy channel between interceptor and relay can be used to invoke the signing and signature checking function.

For a mapped external reference, mapoi can remove the wrapping and return the embedded IOR if it is native to the target environment (it might not be if there is more than one gateway and they lead to different outsides). An external reference that comes in through this gateway will have been mapped by the mapoi function described below. It will have the form:

IOR[hIoL:pIoL:Koi(IOR[ho:po:ko])]

where

Koi(IOR[ho:po:ko])=<tag,"o",IOR[ho:po:ko],h(<tag, "o",IOR[ho:po:ko],S>)>

If the object key has the expected structure, and the hash is valid, the presence of the "o" indicates that IOR[ho:po:ko] is the corresponding external interface and can be returned by mapio.

If the key verifies correctly but contains "i" rather then "o", it means that the IOR is the external reference to an internal service and has been passed in by some out-of-band mechanism, such as email. Such a reference can be used unchanged, as already described in relation to FIG. 15.

For an external reference IOR[ho:po:ko],
mapoi(IOR[ho:po:ko])=IOR[hIoL:pIoL:Koi(IOR[ho:po:ko])]

where hIoL:pIoL is the host and port for the locator for the interceptor that deals with outbound invocations.

Koi(IOR[ho:po:ko])=<tag,"o",IOR[ho:po:ko],h(<tag, "o",IOR[ho:po:ko],S>)>

The result of Koi consists of a tag which allows access to be revoked, a constant "o" that signifies that this the embedded IOR is native to the outside of the gateway that generated this reference, the IOR, and a secure hash of these elements and a secret S.

Tagging references that come in is necessary in order to propagate the tags to outgoing references in nested invocations. The tags also make it possible to revoke references to external services that have been brought inside as well as references to internal services that have been made visible outside.

In this case, the secret S protects against forgery on the inside. Forging an inside form of an external reference would make it possible to establish a connection relay to an arbitrary outside host and port A malicious client could forge an IOR embedding a bogus external IOR with a chosen target host and port, for example, by modifying an existing IOR If the client uses the forged reference as an invocation target, an interceptor will be created for the bogus external service. The interceptor would instruct the relay to establish a connection to the host and port chosen by the forger. If the out-of-band control is being used, the forger can probe for the corresponding port on the relay and so establish a connection to its chosen destination. (This is an argument in favour of the SOCKS-like in-band control strategy where all connections to the relay from the inside must come from components known to be trustworthy—i.e. interceptors.)

For a mapped internal reference, mapoi can remove the wrapping and return the embedded IOR. An internal reference that went out through this gateway will have been mapped by the mapio function described above. It will have the form:

IOR[hTR:pTR:Kio(IOR[hi:pi:ki])]

where

Kio(IOR[hi:pi:ki])=<tag,"i",IOR[hi:pi:ki],h(<tag,"i",IOR [hi:pi:ki],S>)>

If the object key has the expected structure, and the hash is valid, the presence of the "i" indicates that IOR[hi:pi:ki] is the corresponding internal interface and can be returned by mapoi.

If the key verifies correctly but contains "o" rather then "i", it means that the IOR is the internal reference to an external service and has been passed out by some out-of-band mechanism, such as email. Such a reference can be used unchanged.

An inbound invocation will arrive at an interceptor presenting the object key constructed by a previous call of Kio and embedded into an IOR by mapoi. It will have the form Kio(IOR[hi:pi:ki])=<tag,"i",IOR[hi:pi:ki],h(<tag,"i",IOR [hi:pi:ki],S>)> if the required interceptor instance is not currently in place, this object key will be passed to the activator which can instantiate the interceptor.

The activator is part of an interceptor server and has access to the secret 'S'. It can verify the key and check that the key contains the "i" that indicates that the service is native to the inside of this gateway. The activator can then extract the tag and the IOR. If the tag is currently valid (i.e. has not been revoked), the activator can instantiate an interceptor for the IOR and tag.

An outbound invocation will arrive at an interceptor presenting the object key constructed by a previous call of Koi and embedded into an IOR by mapoi. It has the form Koi(IOR[ho:po:ko])=<tag,"o",IOR[ho:po:ko],h(<tag, "o",IOR[ho:po:ko],S>)> if the required interceptor instance is not currently in place, this object key is passed to the activator which instantiates the interceptor.

The activator is part of an interceptor server and has access to the secret 'S'. It can verify the key, and check that the key contains the "o" that indicates that the service is native to the outside of this gateway. The activator can then extract the tag and the IOR. If the tag is currently valid (i.e. has not been revoked), the activator can instantiate an interceptor for the IOR and tag.

The mapping functions have been shown manipulating IORs with only a single profile. Additional profiles can be added both to avoid the use of the object locator, and to make the IORs usable if they are passed by some means other than the gateway (e.g. stringified on a web page or in e-mail).

If mapio includes the original profile in the constructed IOR, it works if it is passed back inside by some alternative route:

mapio(IOR[hi:pi:ki])=IOR[hi:pi:ki,hTR:pTR:Kio(IOR [hi:pi:ki])]

if the original IOR had several profiles they can all be copied. The reverse transformation that mapoi applies will need to remove duplicated profiles in this case.

To avoid the object locator, an additional profile can be added:

mapio(IOR[hi:pi:ki])=IOR[hTR:pTRi:Kio(IOR[hi:pi: ki]),hTR:pTR:Kio(IOR[hi:pi:ki])]

where pTRI is the port on which TR is listening for connections that go the interceptor for the service.

Tags are embedded into the mapped IORs so that the gateway can determine the origin of the reference that is being used to make an invocation. Some references are given distinct tags as starting points; any references passed in invocations are given the same tag, and so can be traced back to one of those starting points. The tags can be used to revoke access to all references passed as a result of using some initial reference, without disturbing other references.

As has already been described, the services are bound in a context for which an interceptor is created, and the reference to the interceptor is published. In general, there can be a hierarchy of contexts under that initial context. The references bound in that hierarchy can be tagged with their names relative to the root of that hierarchy by a specialised naming interceptor.

The specialised naming interceptor performs special mappings on the object references that are passed as parameters. In particular, the reference returned by the 'resolve' operation is the mapped form of the internal reference, with a new tag chosen by the naming interceptor. The interceptor for the root of the externally visible hierarchy uses the name passed as a parameter to 'resolve'. It also ensures that references to naming contexts are mapped from external references to other instances of the specialised naming interceptor.

When an operation is invoked on a sub-context for the first time, a new specialised naming interceptor is activated with the tag that was the name of that context relative to the root of the externally visible hierarchy. When 'resolve' is called on this new interceptor, it constructs a new tag by concatenating its activation tag with the name passed as a parameter. The external root interceptor needs no special code, it just needs to be activated with some chosen 'root' tag, and this is propagated as a prefix to all the tags of the sub-contexts.

With this tagging system, services, and all their derived references, are revoked by unbinding them from the externally visible context.

Where external services are made visible to clients, the references also have tags that can be used to revoke access. References to some initial set of interceptors for external services are bound in some internal context. Using the names in this internal context as the tags for the interceptors leads to the simple revocation process described below. In this case, interceptors used for naming contexts should not have special tagging behaviour. The names being resolved are external names, and do not correspond to internal bindings that can be controlled.

Since interceptors are activated on demand by invocations, the revocation mechanism must block new interceptor activations. Revocation must apply to both inbound and outbound interceptors, and the process is similar in both cases.

With the tagging scheme described above, this is simple for references derived from a service that was made externally visible. The activator is presented with a tag that is the name of the originating service relative to the externally visible service context, perhaps with some 'root' tag prefix. The activator removes the prefix, then attempts to resolve the name. If the resolve succeeds, the service is still available and activation can proceed.

The process can be simplified still further by making the 'root' tag prefix the name of the externally visible service context relative to the internal initial naming context. The activator then just resolves the name, and does not need special knowledge of the external service context.

Immediate revocation of active interceptors can be achieved by mapping through all the interceptors, shutting down all those that were activated with the tag that has now been revoked.

References derived from an external service are tagged with the name by which the interceptor for the external service is bound in the internal naming service. Validity of the tag can be checked by resolving the name. The validation process is the same as for references derived from exported services.

With the tagging scheme described above, a name cannot be re-used for a new service if there was an old service with that name, which was revoked. If the name were to be re-used, references to the old service, and other references passed by using that reference, would become usable again.

This reincarnation of revoked references can be prevented by including in the tag both the name and an object key. The object key is taken from either the exported service, or the interceptor for the imported service. Since the interceptor activator already resolves the name in the tag, it has the object key available for the additional check if the resolve succeeds. If the name is re-used for a new service with a new object key, the tags will not match and the revoked references remain revoked.

If the original service is reinstated, or a new service starts with the same object key, then the old references will once again become valid. This is consistent with the persistence of object references.

If generic interceptors use the Dynamic Skeleton Interface and Dynamic Invocation Interface in the conventional way, the processing requirements for each invocation will be large. This will make it difficult to achieve a high performance gateway.

Application specific interceptors process an IDL type known in advance, and are able to use the more efficient compiled skeletons and stubs.

In order to avoid implementing application specific interceptors for every type used in an application, the performance of the generic interceptors must be brought up to the level of the application specific interceptors.

Dynamic interfaces use a definition of the type of an incoming request that contains the same information as the IDL for the type. The IDL is normally processed by an IDL compiler into source code that is then compiled into object code. The definition available to the dynamic interfaces can equally well be processed by an IDL compiler. This can be done either by generating the textual form for the standard IDL compiler, or by adapting the IDL compiler to work directly from the available definition. The latter process is usually more efficient.

The IDL compiler may generate conventional source code that is then compiled and linked into the gateway. Alternatively, the IDL compiler may generate an intermediate code that can be interpreted efficiently by the gateway to perform the required functions. Both dynamic loading of libraries, and the use of intermediate codes (usually called byte-codes) are well known techniques.

Since it is already known that the interceptor functions perform object reference mapping and then call the target service, the full functions normally provided by stubs and skeletons are not required. There is no need to present the arguments in the form expected by the language mapping. The generated code can operate directly upon the structures presented to the skeletons to produce the output normally generated by stubs. Operating at this level will be ORB-specific, but the IDL compiler for the ORB is specifically designed to operate at this level, and can be adapted to the task.

Figure 23:
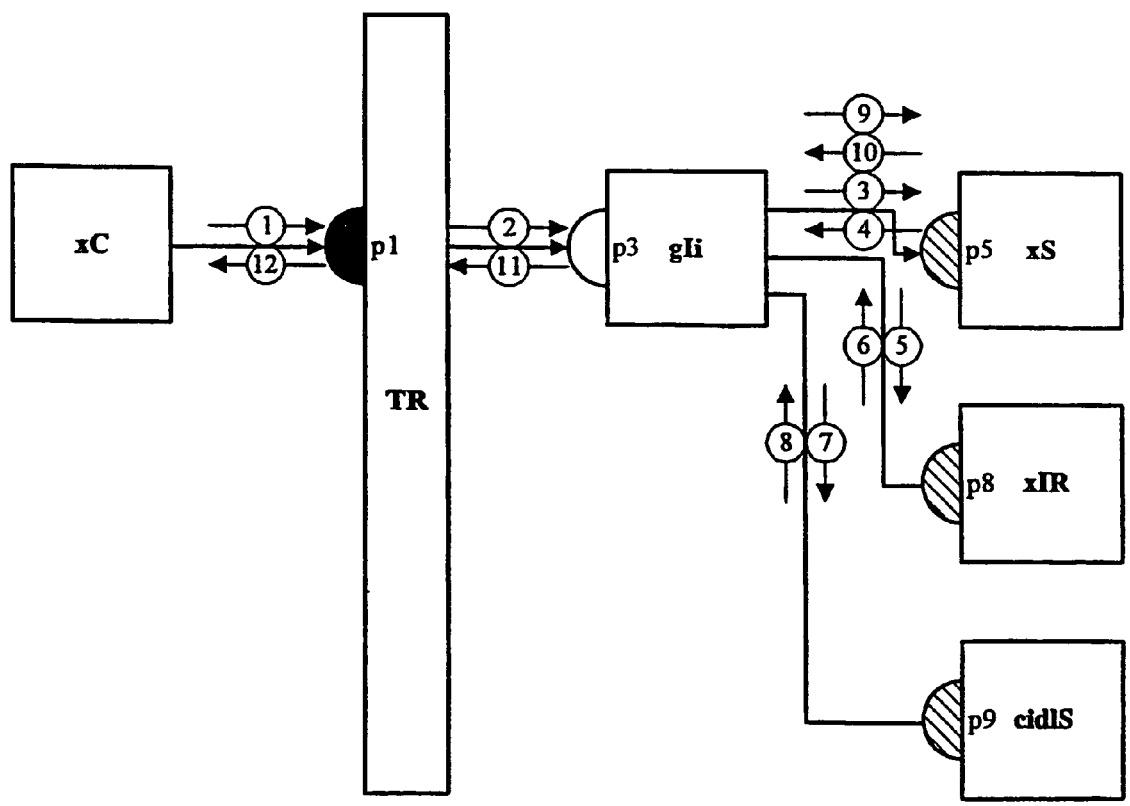
FIG. 23 is a diagram which illustrates an example of dynamic stub and skeleton generation and loading.

FIG. 23 illustrates the dynamic stub and skeleton generation process. This is a variant of the process illustrated in FIG. 20, in which the interactions with the object locator, and DII client interactions with the interface repository have been omitted for clarity. The new components are:

gIi: a generic interceptor for inbound invocations cidlS: the IDL compiler server The IDL compiler is shown as a CORBA service in order to illustrate when it is used. In practice, it may be incorporated into the generic interceptor, or invoked as a program, depending on the available language and operating system facilities.

The sequence of events for an inbound invocation from a client xC starts with gIi holding a reference IOR[hcidlS:p9:kcidl] to the IDL compiler server, and xC holding the object reference ref=IOR[hTR:p1:kxI], and making the invocation ref→op(args).

1 xC connects to hTR:p2 and sends request kxI:op:args.

2 TR connects to hgIi:p3 and sends request kxI:op:args.

3 gIi does not have an implementation registered for kxI on the first call, and so passes the key to its activator function. The activator in gIi connects to hxS:p5 and sends request kxS:get_interface:—gIi needs to obtain information about the interface in order to generate the stubs and skeletons that will be used to process the request gIi knows kxI→IOR[hxS:p5:kxS] because kxI=Kio(IOR[hxS:p5:kxS]) where Kio is a function that wraps an IOR and some other information into an object key, and gIi has functions to verify kcI and extract the IOR.

4 xS replies with NO_EXCEPTION:xDef—xDef is IOR [h:p8:kxD], a reference to an 'InterfaceDef' object in xIR that describes interface 'x'.

5 gIi connects to hxIR:p8 and sends request kxD:describe_interface:

6 xIR replies NO_EXCEPTION:xDesc where xDesc is the 'FullInterfaceDescription' for 'x'.

7 gIi connects to hcidlS:p9 and sends the request kcidl:compile:xDesc, requesting compiled skeletons and stubs corresponding to the description xDesc 8 cidlS replies NO_EXCEPTION:xIicode, where xIicode is the compiled code for an interceptor specialised for 'x'.

9 The activator in gIi loads the code 'xIicode' and registers this as the implementation for the key kxI. The invocation received in step 2 is passed to this new interceptor for processing. The new interceptor in gIi uses the connection established at step 3 to hxS:p5 and sends request kxS:op:mapoi(args)—these are the operation and arguments sent from the client at step 1. Since the arguments originate on the outside, the outside to inside mapping function mapoi is used.

10 xS performs service and replies status:results 11 gIi replies status:mapio(results)—the results will be sent outside so inside to outside mapping function mapio is used.

12 TR replies status:mapio(results)

The dynamically generated interceptor can remain in place to handle further invocations, and additional instances of the interceptor can be created to handle other objects of the same type, without needing to regenerate or reload the code.

Unless there is an exceptionally large number of types in use, the generic interceptor will be able to keep the code available thus avoiding the cost of going back to the IDL compiler.

The delay on the first call can also be avoided by generating the code in advance. The server object reference is available when it is being mapped for passing as an argument or result. The code generation could be performed at any time after this up to the point where the interceptor is needed as described in the example above.

It will be appreciated that this dynamic skeleton and stub generation process can also be applied to a DCOM gateway since DCOM also defines the interfaces to objects in an Interface Definition Language that is processed by an IDL compiler.

REFERENCES

[OMG 97a] CORBAservices: Common Object Services Specification, OMG, July 1997

[OMG 97b] The Common Object Request Broker: Architecture and Specification, Revision 2.1, OMG, August 1997

[OMG 95] The Common Object Request Broker: Architecture and Specification, Revision 2.0, OMG, July 1995

[SOCKS] "SOCKS Protocol Version 5", M Leech, M. Ganis, Y. Lee, etc., RFC 1928, March 1996

What is claimed is:

1. A system arranged to provide a gateway between a first network and a second network, the system comprising:
   interface means to receive from the first network a message intended for an object in the second network, the message including an identifier for a further object in either the first or second network;
   means to generate further interface means for receiving from the second network messages for the further object;
   means to form a new identifier for the further interface means, the new identifier including check data resulting from a hash operation for checking the validity of the or at least part of the new identifier;
   means to replace the received identifier with the new identifier in the message; and
   means to forward the message to the object in the second network.

2. A system according to claim 1, wherein the new identifier includes information to enable subsequent recovery by the system of the received identifier.

3. A system according to claim 2, wherein the new identifier includes a representation of the received identifier.

4. A system according to claim 2, wherein the new identifier includes an indication of the identity of the received identifier and the system includes means to associate said indication with said received identifier.

5. A system according to claim 1, comprising means to include in the new identifier a name tag to identify the interface means.

6. A system according to claim 1, wherein the check data further comprises a secret.

7. A system according to claim 1, comprising means to include in the new identifier an indication that the received identifier was received in an message from the first (or second) network.

8. A system according to claim 1, comprising means to determine whether the received identifier originated from the first network or the second network.

9. A system according to claim 8, comprising means to form the new identifier on the basis of the determined origin.

10. A system according to claim 9, wherein, if the received identifier originated in the first network, the means to form the new identifier forms a new identifier including information to enable subsequent recovery by the system of the received identifier.

11. A system according to claim 9, wherein, if the received identifier originated in the second network, having passed through the system from the second network to the first network, the means to form the new identifier forms a new identifier comprising an original identifier recovered from information included in the received identifier.

12. A system according to claim 9, wherein, if the received identifier originated in the first network, having passed through the system from the first network to the second network and having passed back to the first network other than through the system, the means to form the new identifier forms the new identifier as a copy of the received identifier.

13. A system according to claim 1, comprising means to detect a name tag in the message.

14. A system according to claim 13, comprising means to determine on the basis of the name tag whether the object in the second network is valid and is still available to receive messages.

15. A system according to claim 14, wherein the means to determine initiates a call to a naming service, the naming service being configurable by an authorised party by adding or removing name tags, and the presence or absence of a name tag being indicative of whether the object associated with the name tag is available or not respectively.

16. A system according to claim 1, comprising means to verify the received identifier.

17. A system according to claim 16, wherein identifier includes check data to enable verification of the received identifier.

18. A system according to claim 17, wherein the check data is the result of a hash operation enacted on at least part of the identifier and a secret, and the means to verify the received identifier is configured to enact a similar hash operation on the same part of the identifier and a secret and compare the resulting check data with the received check data.

19. A system according to claim 18, wherein the secret is stored by and only accessible by the gateway.

20. A system according to claim 1, wherein the means to generate the further interface means comprises means to determine on the basis of the received identifier whether a template for an appropriate further interface means is already known to the system.

21. A system according to claim 20, wherein the means to generate the further interface means comprises means, which is operable in the event an appropriate template is not known to the system, to obtain an appropriate template from a remote repository.

22. A system according to claim 20, wherein the means to generate the further interface means comprises means, which is operable in the event no appropriate template is known to the system and/or an appropriate template is not recoverable from a remote repository, to obtain a generic template.

23. A system according to claim 20, wherein the means to generate the further interface is arranged to at least obtain a template for the further interface means on or after receipt of the received identifier and in advance of receipt of a message for the further object.

24. A system according to claim 1 configured for operation in a trusted operating system.

25. A system according to claim 24, wherein the trusted operating system enforces Mandatory Access Control.

26. A system according to claim 25, comprising at least two logical compartments and a trusted relay process that has privileges necessary to pass messages between the two compartments, wherein the first network and the respective interface means are associated with a first compartment and the second network is associated with a second compartment.

27. A system according to claim 25, wherein a secret, usable by the system in a hash operation for validating object references, is associated with a third compartment, and wherein only the trusted relay process has the privileges necessary to retrieve the secret from the further compartment in order to enact a hash operation.

28. A system according to claim 1, wherein the received identifier is an Interoperable Object Reference having the form IOR[host: port: key].

29. A system according to claim 1, wherein the new identifier is an Interoperable Object Reference having the form IOR[host x: port x: key x], wherein key x includes information to enable subsequent recovery by the system of the received identifier.

30. A system according to claim 29, wherein key x includes a representation of the received object reference IOR[host i: port i: key i].

31. A system according to claim 29, wherein key x includes:
   an identifier to indicate from which network the object reference originated;
   a name tag associated with an identity of the gateway process; and
   check data for verifying the validity of the object reference.

32. The system according to claim 1, wherein the further interface means corresponds to the further object and the further interface means is generated only when or after the message including the identifier for the further object is received.

33. A method of controlling a gateway to pass messages for objects between first and second networks attached to the gateway, the method comprising the steps of:
   receiving from the first network a message for an object in the second network, the message including an identifier for a further object in either the first or second network;
   generating means to receive messages for the further object;
   forming a new identifier for the means to receive messages for the further object, the new identifier including check data resulting from a hash operation for checking the validity of the or at least part of the new identifier;
   replacing the received identifier with the new identifier in the message; and
   forwarding the message to the object in the second network.

34. The method of claim 33, wherein the further interface means corresponds to the further object and the further interface means is generated only when or after the message including the identifier for the further object is received.

* * * * *